April 7, 1931. A. W. CAPS 1,800,007

PHOTOGRAPHIC COPYING MACHINE

Filed June 22, 1925 11 Sheets-Sheet 1

INVENTOR
Arthur W. Caps.
BY
ATTORNEY

April 7, 1931. A. W. CAPS 1,800,007
PHOTOGRAPHIC COPYING MACHINE
Filed June 22, 1925 11 Sheets-Sheet 2

INVENTOR
Arthur W. Caps.
BY
ATTORNEY

April 7, 1931. A. W. CAPS 1,800,007
PHOTOGRAPHIC COPYING MACHINE
Filed June 22, 1925 11 Sheets-Sheet 3

INVENTOR
Arthur W. Caps.
BY
ATTORNEY

April 7, 1931.  A. W. CAPS  1,800,007
PHOTOGRAPHIC COPYING MACHINE
Filed June 22, 1925  11 Sheets-Sheet 4

INVENTOR
Arthur W. Caps.
BY
ATTORNEY

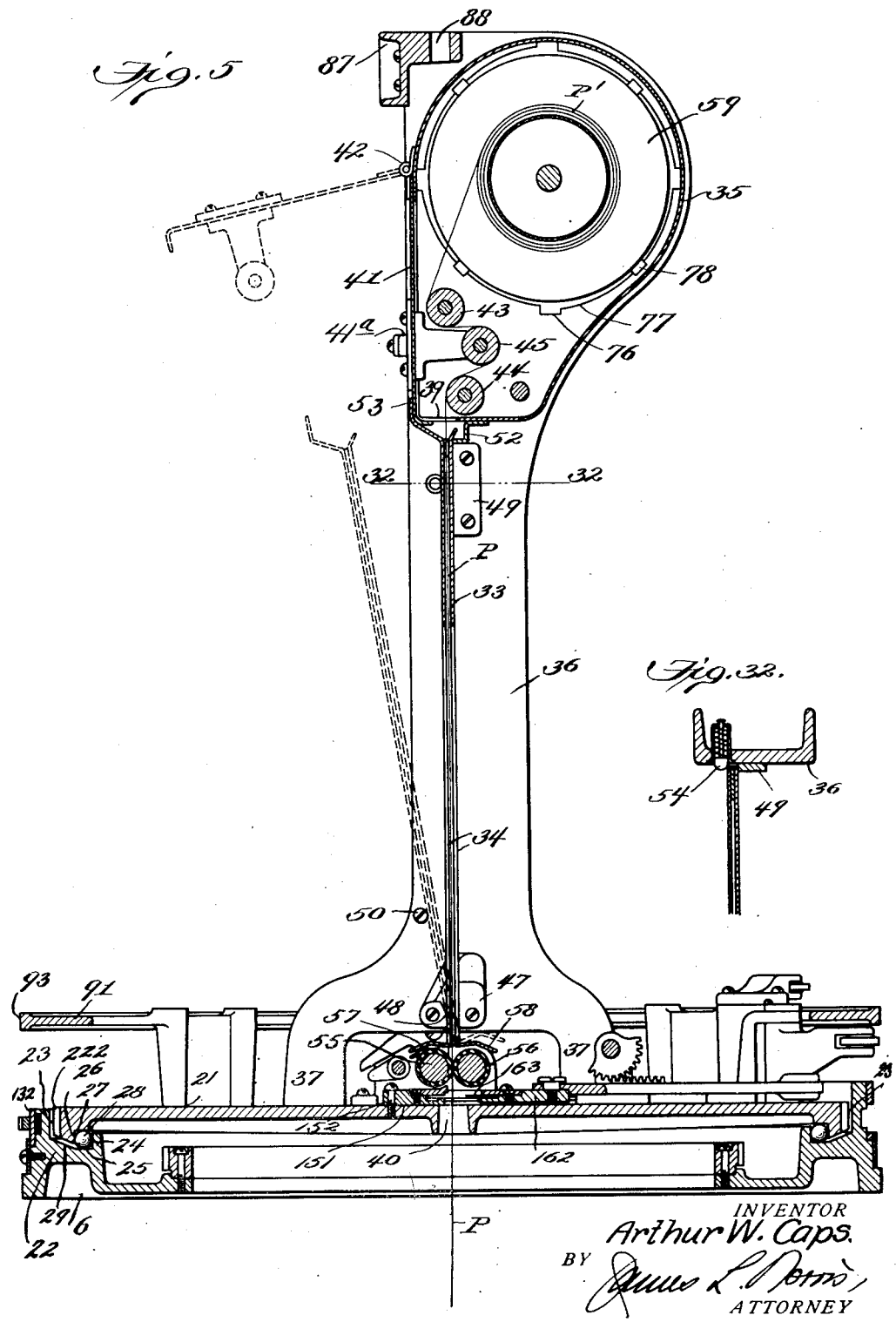

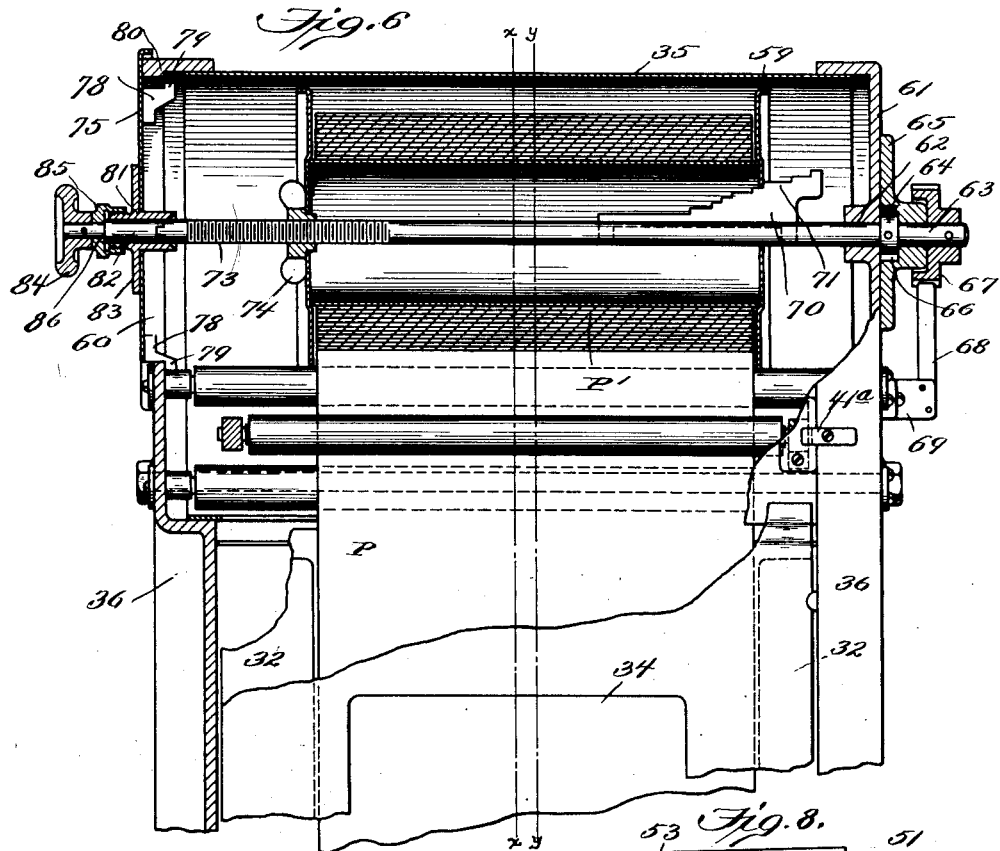
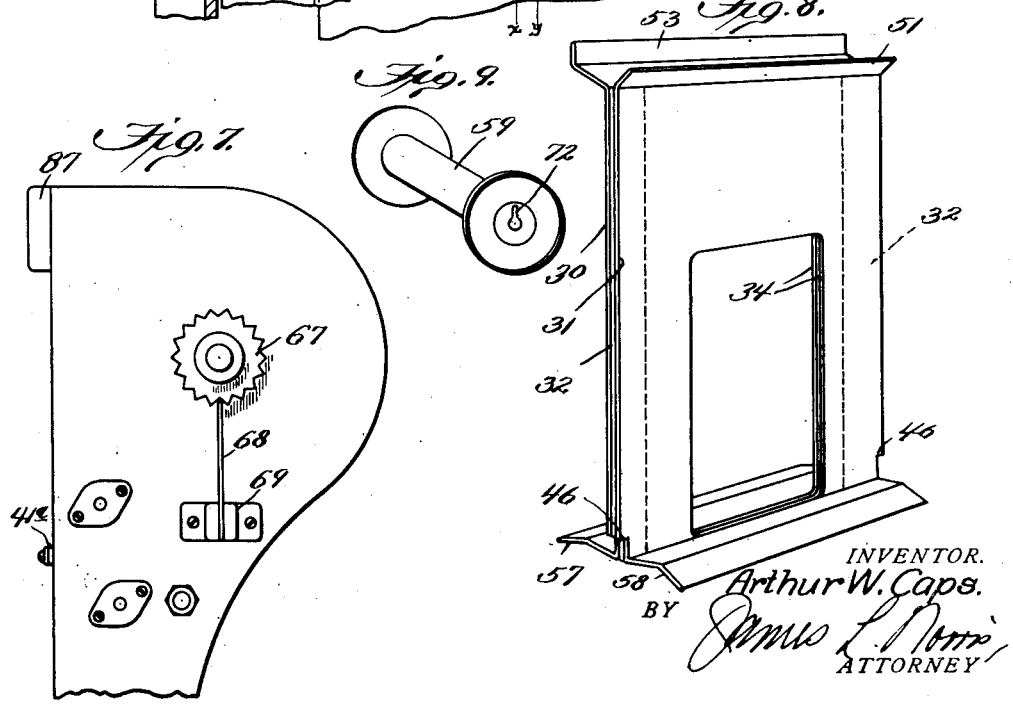

April 7, 1931. A. W. CAPS 1,800,007
PHOTOGRAPHIC COPYING MACHINE
Filed June 22, 1925 11 Sheets-Sheet 7
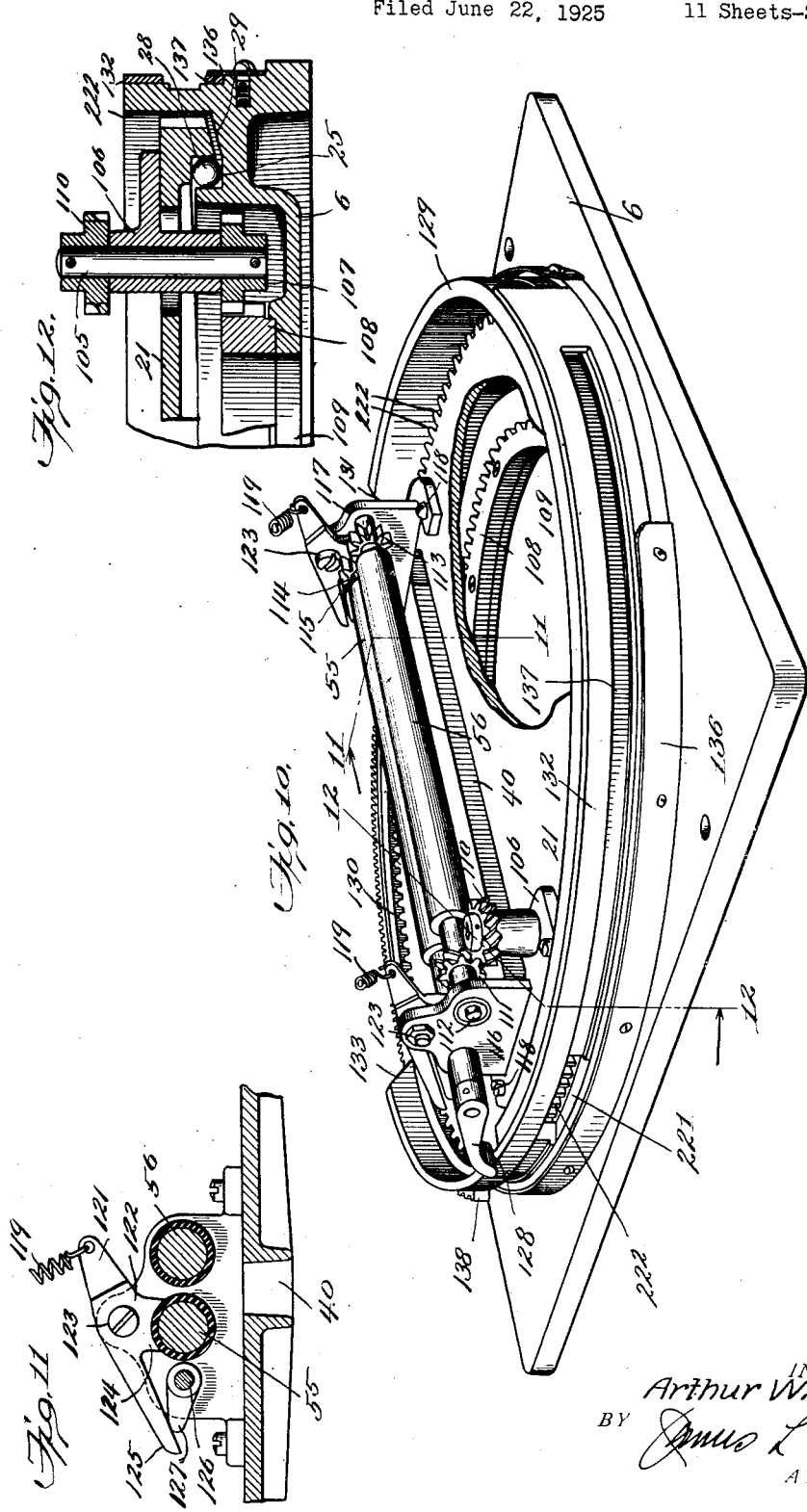
INVENTOR
Arthur W. Caps.
BY
ATTORNEY April 7, 1931.  A. W. CAPS  1,800,007
PHOTOGRAPHIC COPYING MACHINE
Filed June 22, 1925   11 Sheets-Sheet 8
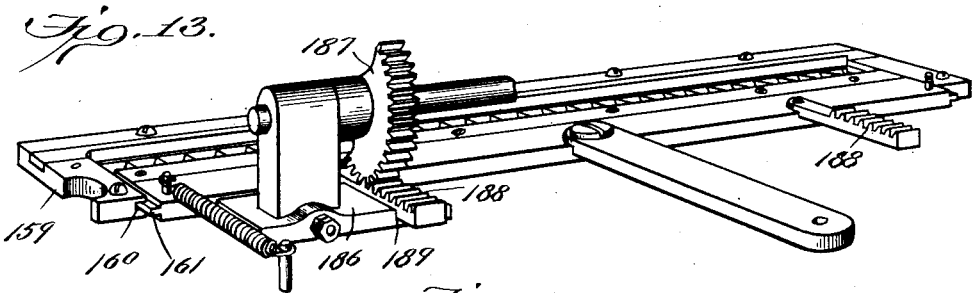
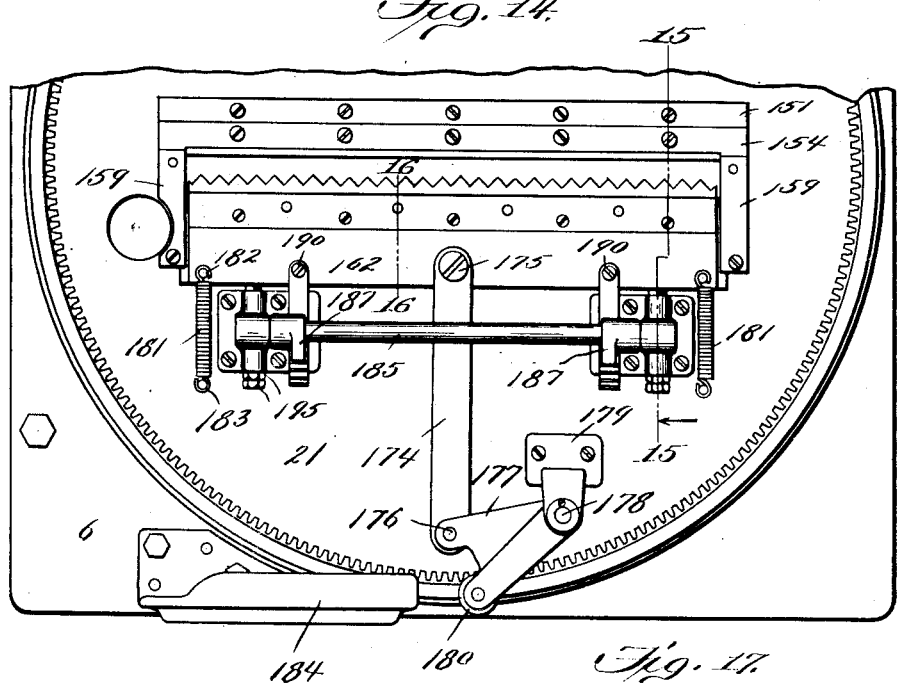
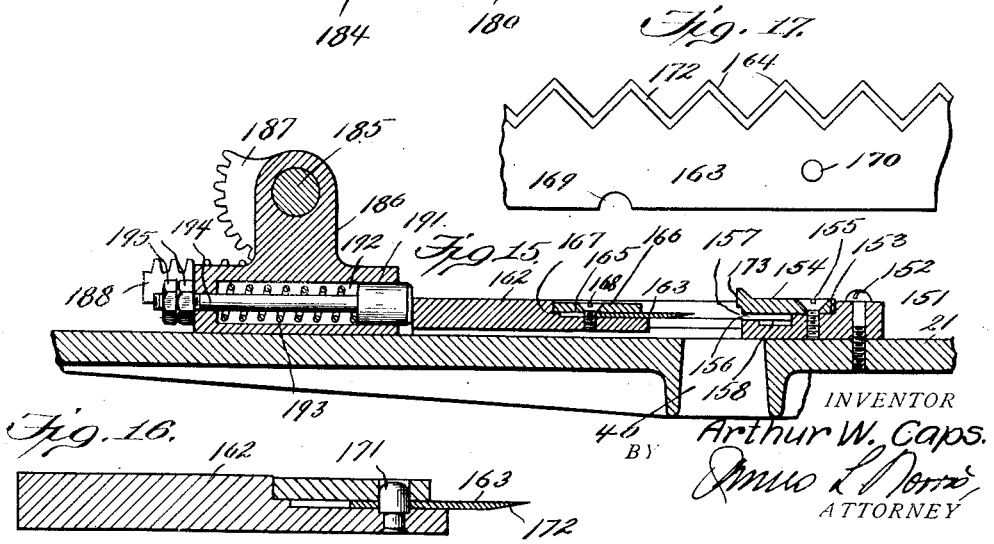
INVENTOR
Arthur W. Caps.
BY
ATTORNEY

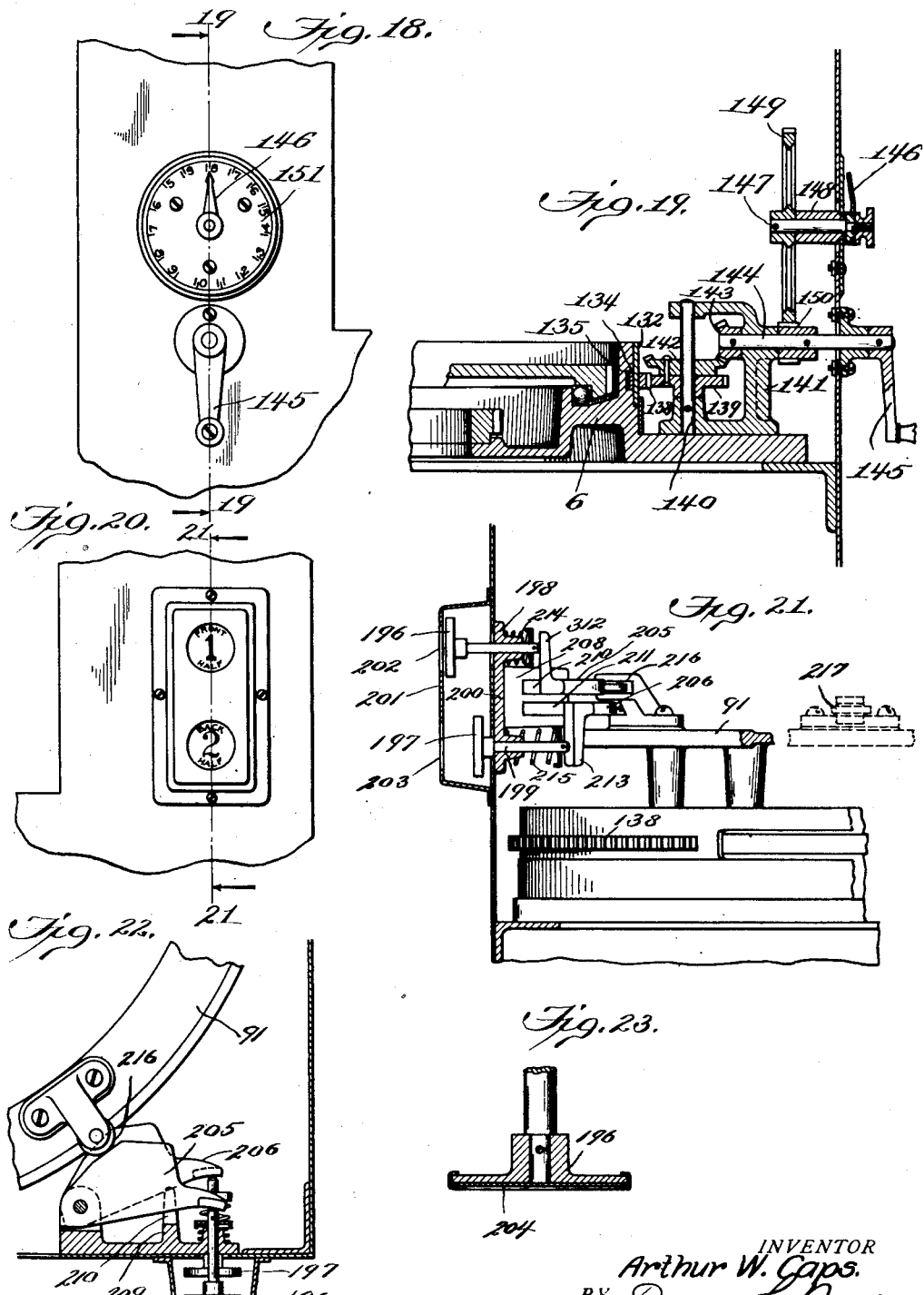

April 7, 1931.   A. W. CAPS   1,800,007
PHOTOGRAPHIC COPYING MACHINE
Filed June 22, 1925   11 Sheets-Sheet 10
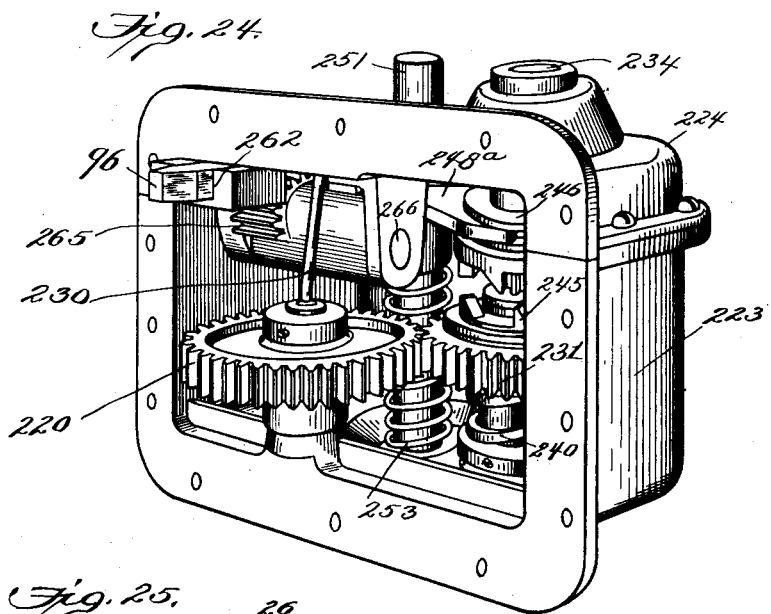
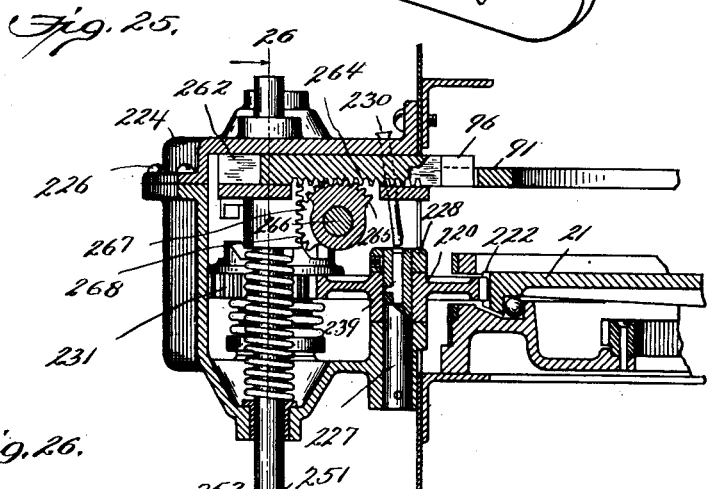
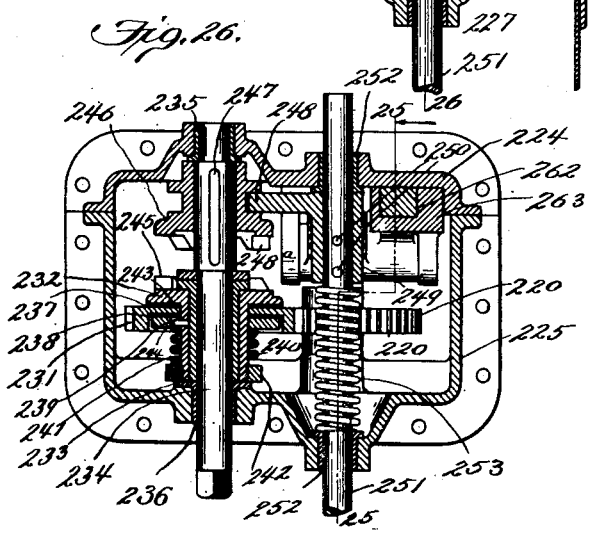
INVENTOR
Arthur W. Caps.
BY
ATTORNEY April 7, 1931.  A. W. CAPS  1,800,007
PHOTOGRAPHIC COPYING MACHINE
Filed June 22, 1925   11 Sheets-Sheet 11
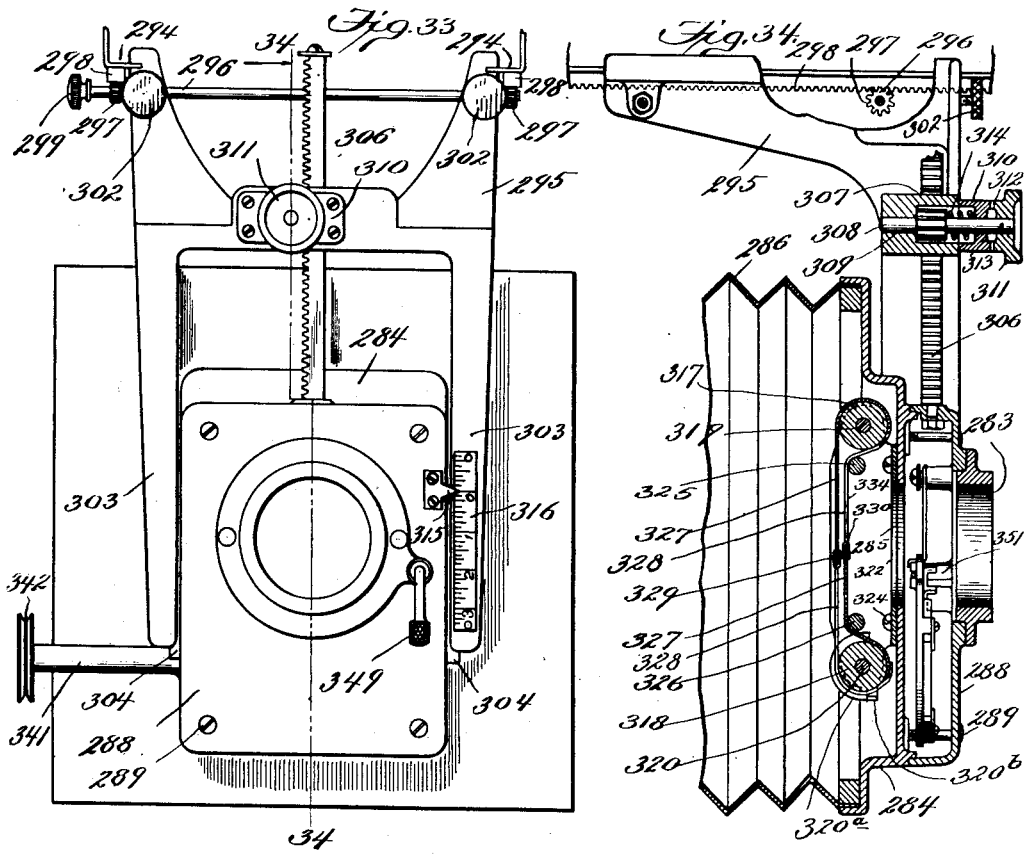
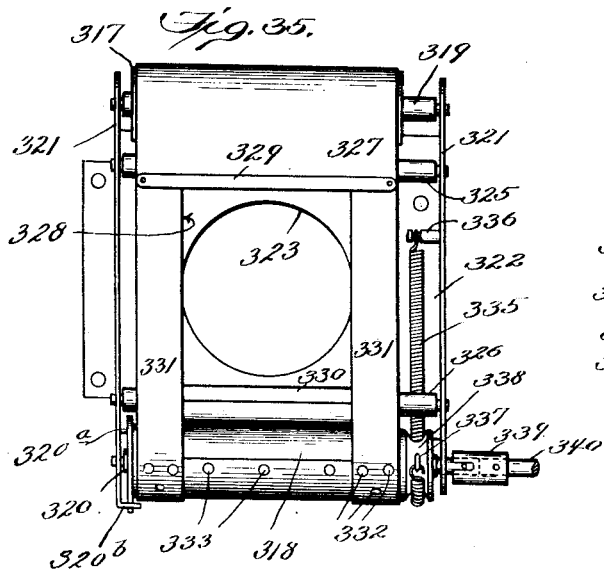
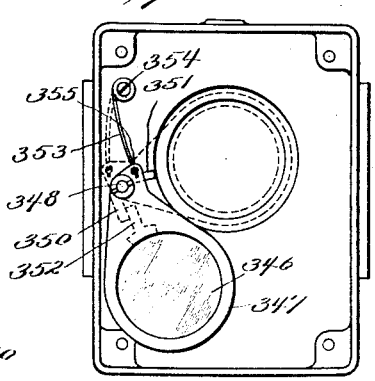
INVENTOR
Arthur W. Caps.
ATTORNEY Patented Apr. 7, 1931

1,800,007

UNITED STATES PATENT OFFICE

ARTHUR W. CAPS, OF KANSAS CITY, MISSOURI, ASSIGNOR TO PHOTOSTAT CORPORATION, OF PROVIDENCE, RHODE ISLAND, A CORPORATION OF RHODE ISLAND

PHOTOGRAPHIC-COPYING MACHINE

Application filed June 22, 1925. Serial No. 38,844.

The present invention relates to improvements in photographic copying machines, and more especially to those of the class wherein the images of the documents or other objects to be copied are rectified and photographed directly onto the sensitized paper or other photographic material without requiring the making of negatives.

The primary object of the invention is to provide, for a machine of this general class, means whereby a sheet of photographic paper, sensitized on both sides, may be mechanically rotated to present its opposite sides consecutively for exposure by the lens and for accurately positioning the paper, after each rotation thereof, in a plane perpendicular to the optical axis of the lens.

Another object is to provide means for mechanically feeding a strip or sheet of photographic paper whereby an exposed section thereof is removed from the field of exposure of the lens and an unexposed section of the paper is brought into the field of exposure, during or incident to the rotation of the paper.

Another object is to provide means for severing the sensitized strip at appropriate points according to the exposed areas thereof, during or as an incident to the rotation of the strip.

Another object is to provide means whereby the operator of the machine is enabled to easily, quickly and accurately set the paper or strip-feeding mechanism to feed any given length of the paper between the minimum and maximum limits of the machine, the feeding means, at each setting thereof, insuring the feed of a constant or predetermined length of paper until it is reset for the feeding of a different length of paper.

Another object is to provide means for guiding the sensitized strip edgewise and in the direction of the focal plane of the lens whereby certain portions of the sheet are masked off from the field of exposure and will provide an unexposed margin on the exposed sections of the strip.

Another object is to provide a mounting for the paper strip-guiding and masking means whereby the mask openings which determine the portions of the sensitized strip to be exposed are centered with respect to the optical axis of the lens, thereby insuring proper registration of the exposures made on opposite sides of the strip or sheet.

Another object is to provide a mask wherein the center of the sensitized strip is located at one side of the center of the mask openings, whereby a relatively wide unexposed margin is provided at one edge of the exposed sections of the strip to facilitate binding thereof in a book.

A further object of the invention is to provide operating and controlling mechanism whereby the operations of rotating or reversing the sensitized paper strip to bring its opposite sides consecutively into position for exposure, feeding the strip to deliver the exposed section and to bring another unexposed section thereof into exposing position, and severing the exposed section from the remainder of the strip are performed automatically and in properly timed sequence when such mechanism is tripped or set into operation by the operator upon completion of the exposing operation or operations, suitable indicators being preferably provided to inform the operator of the completion of these operations, the speed of operation of the machine being thus greatly increased and the operator being relieved of the duty of performing these operations manually, as heretofore, the operator being thus enabled to give his attention primarily to the selection and arrangement of the copy or matter to be photographed and to the exposing thereof.

To these and other ends, the invention consists in certain improvements and combinations and arrangements of parts, all as will be hereinafter more fully described, the features of novelty being pointed out particularly in the claims at the end of the specification.

In the accompanying drawings:—

Figure 5 is a detail view taken centrally and vertically through the paper-feeding and rotating mechanism;

Figure 6 is a detail view of the paper-supplying means, the section being taken longitudinally and vertically through the paper receptacle or storage chamber;

Figure 7 is an elevation of the right-hand end of the structure shown in Figure 6;

Figure 8 is a detail perspective view of the paper-guiding and masking means;

Figure 9 is a detail perspective view on a reduced scale of a paper spool adapted for use in the machine;

Figure 10 is a detail perspective view of the base and turn-table for the paper-supplying and positioning means;

Figure 11 represents a cross-section through the paper-feeding rolls on the line 11—11 of Figure 10;

Figure 12 represents a cross-section through the base and turn-table, on the line 12—12 of Figure 10;

Figure 13 is a detail perspective view; on an enlarged scale, of the paper-severing knife;

Figure 14 is a top plan view of a portion of the base and turn-table, showing the paper-severing knife and its operating means mounted thereon;

Figure 15 represents a vertical section through the paper-severing knife on the line 15—15 of Figure 14;

Figure 16 represents a vertical section through the movable knife blade and the slide which carries it, the section being taken on the line 16—16 of Figure 14;

Figure 17 is a detail view of a portion of the knife blade;

Figure 18 is a view of a fragment of the casing of the machine showing the operating handle for the paper-measuring device and the indicating dial therefor;

Figure 19 represents a section on the line line 19—19 of Figure 18;

Figure 20 is a view of another fragment of the casing of the machine showing the indicating devices which inform the operator whether the front or rear side of the paper is in position for exposure;

Figure 21 represents a section through the indicating devices and adjacent parts, the section being taken on the line 21—21 of Figure 20;

Figure 22 is a top plan view of the indicating devices and other controlling means, as shown in Figure 20;

Figure 23 is a detail view, partly in section, of one of the indicating devices;

Figure 24 is a perspective view of mechanism provided for rotating the turn-table to reverse the paper strip;

Figure 25 is a vertical sectional view through the mechanism shown in Figure 24 and the adjacent portion of the turn-table to which it is connected, this figure representing a section taken on the line 25—25 of Figure 26;

Figure 26 represents a section taken vertically through the mechanism shown in Figures 24 and 25 on the line 26—26 of Figure 25;

Figure 27 is a fragmentary detail view of a part of the control means for the turn-table operating mechanism;

Figure 28 is a detail sectional view of a portion of the driving means for the turn-table operating mechanism, this figure representing a section on the line 28—28 of Figure 1;

Figure 29 represents a section taken vertically through the copyboard on the line 29—29 of Figure 2;

Figure 30 is a fragmentary detail view in perspective of a portion of the copyboard elevating gearing;

Figure 32 is a detail view representing a horizontal section on the line 32—32 of Figure 5;

Figure 33 is a front view, on an enlarged scale, of the lens board;

Figure 34 represents a vertical section taken on the line 34—34 of Figure 33;

Figure 35 is a detail view of the shutter on an enlarged scale and as viewed from the left in Figure 34; and Figure 36 is a view of the front plate of the lens board as viewed from the rear or from the left in Figure 34, illustrating the color filter and its mounting.

Similar parts are designated by the same reference characters in the different views.

Figure 1:
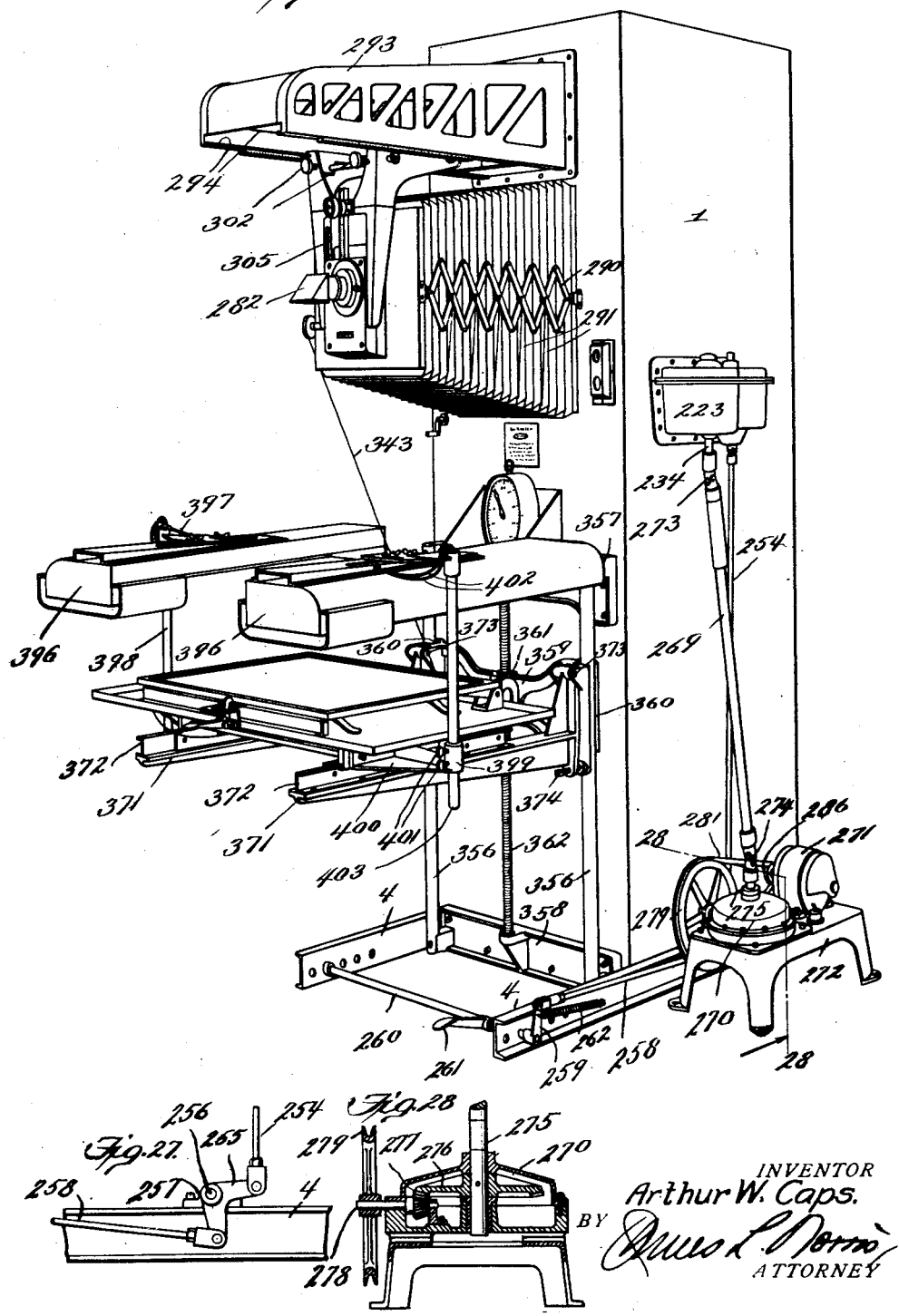
Figure 1 is a perspective view of a photographic copying machine constructed in accordance with the present invention.
Figure 2:
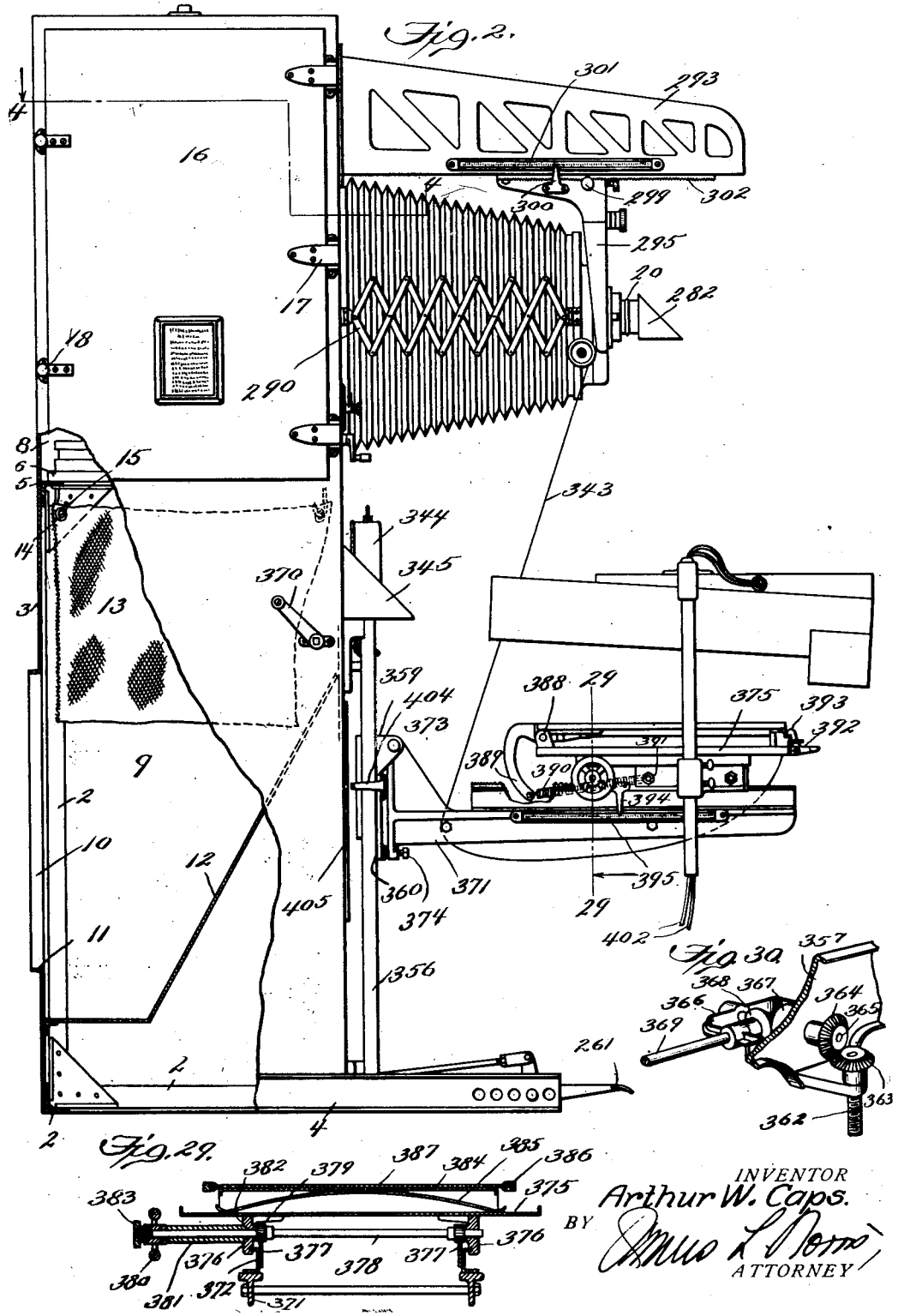
Figure 2 is a side elevation of the machine shown in Figure 1, a portion of the casing thereof being broken away.

The present invention, in whole or in part, is applicable generally to photographic copying or recording machines of the general class in which the photographic material to be exposed for the production of photographic prints of documents or other objects is in the form of a strip, portions of which are successively brought into the field of exposure of the lens by advancing the strip longitudinally, and the exposed portions are severed from the remainder of the strip and delivered for developing, fixing or other operations, as required, for the production of the finished photographic prints. The preferred embodiment of the invention is shown in the accompanying drawings, and it will be hereinafter described in detail, but it is to be understood that the invention is not restricted to the precise construction shown, as equivalent constructions are contemplated, and such will be included within the scope of the claims.

The photographic copying machine, as shown in the present instance, comprises a suitable casing 1, which is constructed preferably of metal and of substantially rectangular form. For example, the casing may comprise angle-iron frame members 2 to which are applied sheet metal plates 3 to form a light-tight cabinet to support or contain the various parts of the machine. The lower portion of the casing or cabinet is preferably provided with base rails 4 which afford sufficient strength to support the weight of the machine, and these base rails preferably extend forwardly for a sufficient distance in front of the casing or cabinet to provide sufficient stability for the parts of the machine which extend forwardly from the casing or cabinet. The casing is divided interiorly by a horizontal support 5, which may be constructed of angle iron, as shown, and a base or platform 6 resting thereon and secured thereto by screws 7 or other suitable means, forming an upper compartment 8 which contains the paper, feeding, positioning and reversing means, and a lower compartment 9 into which the exposed and severed sections of the paper strip are delivered.

Figure 3:
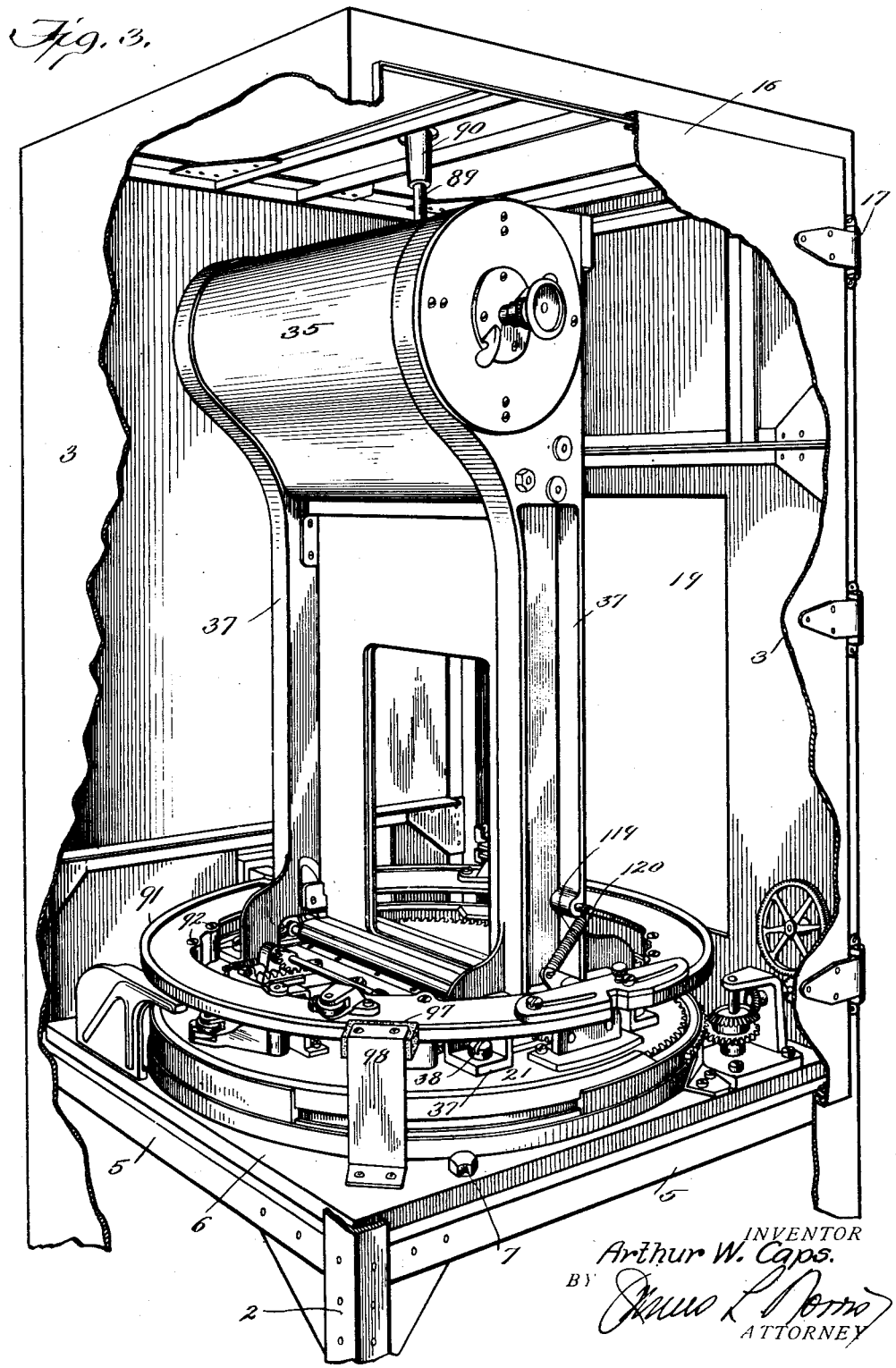
Figure 3 is a perspective view, on an enlarged scale, of the upper portion of the machine, a portion of the casing thereof being broken away to illustrate the interior mechanism.

Preferably, the copying machine is constructed to be operated in conjunction with a dark room in which the exposed and severed sections of the strip are developed, fixed or otherwise treated to produce the finished prints. For this purpose, the rear wall of the casing of the machine is provided with an opening 10 which is adapted to provide communication between the dark room and the lower compartment 9 of the machine, it being preferable to place the rear wall of the machine against the wall of the dark room, this wall of the dark room having a suitable opening to register with the opening 10 in the rear wall of the casing of the machine, and the opening 10 in the rear wall of the machine may be surrounded by a rearwardly extending flange 11 to provide a light-tight joint between the machine and the dark room. In order to facilitate removal of the exposed and severed sections of the strip delivered into the compartment 9, the latter is provided with a rearwardly and downwardly inclined wall 12 which is adapted to deflect or guide the exposed and severed sections of the strip rearwardly so that they will accumulate at a point immediately adjacent to the opening 10, thus facilitating their removal from the machine. Also, it is preferable to place a light-proof sleeve 13 in the upper portion of the compartment 9 through which the exposed and severed sections of the strip may pass in order to protect these light-sensitive sections of the paper from light which might enter through crevices in this portion of the casing. The sleeve 13, when used, is composed preferably of some light-proof flexible fabric made in the form of a tube and its upper end may be provided with eyelets 14 to detachably engage hooks 15 suitably supported within the casing as by the angle-irons 5. By this arrangement, the sections of the photographic paper which have been exposed through the lens of the machine and have been severed from the remainder of the strip, are delivered to the compartment 9, and they may be removed from this compartment, through the opening 10 into the adjacent dark room and there developed, fixed, or otherwise treated, to produce the finished photographic prints. The upper compartment 8 of the casing contains the means which positions different portions of the photographic paper in the field of exposure of the lens, the means which rotates the photographic strip to reverse it and thereby present its opposite sides successively to the lens, the means for feeding the exposed section of the strip for delivery while bringing another unexposed section of the strip into position for exposure, and the means for severing the exposed sections of the strip, and to permit access to this compartment the casing may be provided with a door 16 which is capable of forming a light-tight fit at its edges, the door being supported, for example, at one edge by hinges 17 and provided at its opposite edge with screw clamps 18 or other suitable fastenings. The front wall of the casing is provided with an opening 19 (Figs. 3 and 4) through which the exposures are made from a lens 20 which will be hereinafter described.

Means is provided for guiding and supporting the sensitized paper so that a surface thereof will be positioned in the focal plane of the lens so an exposure may be made on such side of the paper and for rotating the paper about an axis transverse to the optical axis of the lens to reverse it and thereby bring the opposite side of the paper into position for exposure through the lens, and, according to the present invention, the rotation of the paper to bring its sides consecutively into position for exposure is effected mechanically and devices are provided for controlling the paper-rotating means and for accurately positioning the paper in the different exposing positions. Preferably, and as shown, a turn-table 21 (Figs. 3, 5 and 10) is employed, this turn-table being preferably circular in form and supported on and adapted to rotate with respect to the base 6. In the construction shown, the base 6 is provided with an upstanding circular rim 22 which may be formed with an annular groove or recess 23 in its upper side in which the rim or periphery of the turn-table 21 fits, and a suitable bearing is provided between the turn-table and base whereby the former may rotate with respect to the latter. For example, the inner wall 24 and the bottom wall 25 of the annular recess 23 may be formed in perpendicular relation to one another, as shown in Figures 5 and 12 to form a stationary ball race, and the lower peripheral portion of the turn-table may be formed with complemental surfaces 26 and 27 to provide a ball-race thereon opposite to that on the base, and an annular series of anti-friction balls 28 are introduced between the ball race on the base and turn-table, respectively, and these balls rotatively support the turn-table and center it accurately with respect to the base. In order to facilitate the introduction of the balls 28 into the ball-race on the base and to maintain these balls in the stationary ball-race, so that the turn-table may be removed from the base or applied thereto without disturbing the balls, a portion 29 of the bottom wall of the circular or annular recess 23 may be sloped downwardly and inwardly toward the bottom wall 25 of the stationary ball-race, in consequence of which the balls, when introduced into the annular recess 23, will roll by gravity downwardly and inwardly until they rest against the circular upstanding wall 25 of the stationary ball-race, this enabling the turn-table to be applied to the base, so that the anti-friction balls will be properly received by the ball-race on the under side of the turn-table and formed by the surfaces 26 and 27 thereon. Preferably, a circular series of balls 28 is employed which completely fills the ball-races.

The turn-table which, in the present embodiment of the invention, is rotatable in a horizontal plane, carries means for guiding and positioning the sensitized paper. The paper-guiding and positioning means is preferably constructed as a mask adapted to perform the additional function of determining the area of the sensitized paper to be exposed. The mask comprises preferably opposed plates 30 and 31 which are placed opposite to one another and are spaced apart by interposed strips 32 which extend longitudinally of the vertical edges of the mask, the space thus provided between the plates 30 and 31 and between the inner vertical edges of the strips 32 forming a passageway 33 for the paper designated P. The plates 30 and 31 are provided with exposure openings 34 which register with one another, these exposure openings corresponding in dimensions to the dimensions of the exposures to be made on the sensitized surfaces of the paper. The machine is particularly adapted for the exposure of paper which is sensitized on both sides, and in using paper of this kind, the opposite sensitized surfaces of the paper will be exposed consecutively through the respective exposure openings 34 in the mask by bringing these exposure openings consecutively toward the exposing lens by appropriate rotation of the turn-table which carries the mask.

The sensitized paper used is preferably supplied to the machine in the form of a roll P' and the paper is fed from this roll in the form of a strip. The paper roll is preferably carried by the turn-table, so that the roll will rotate therewith and with the mask and thus avoid altering the relationship between the paper roll and the portion of the strip which is positioned for exposure by the mask. As shown in the present instance, the paper roll is adapted to be inserted into a light-tight paper roll receptacle 35 (Figs. 3, 5 and 6), and this paper roll receptacle is supported by a pair of uprights 36 which extend upwardly from the turn-table. The lower ends of these uprights are rigidly fixed to the upper side of the turn-table, as, for example, by providing these uprights with feet 37 at their lower ends and attaching these feet to the turn-table by securing screws 38, or other suitable means. The uprights 37 are spaced apart to a proper extent to receive the mask between them, the mask being adapted to occupy a position so that the upper end of the paper passageway 33 therein will receive the paper strip P fed through an opening 39 in the lower wall of the paper roll chamber 35 and the lower end of the paper passageway 33 of the mask will be positioned to deliver the paper strip through a slot or opening 40 which extends through the turn-table, as is shown in Fig. 5. One wall of the paper roll chamber 35 is provided with a door 41 which is preferably suspended at its upper edge as by a hinge 42, and this door is adapted to swing either into an open position, substantially as is indicated by the dotted lines in Fig. 5, or into a closed position, as shown by the full lines in that figure. The paper roll chamber preferably contains a pair of freely revoluble or idler rolls 43 and 44 which are arranged so that the paper strip P, as it unwinds from the roller P', will pass at the same side of these rolls on its way to the opening 39 in the bottom of the paper roll chamber. The door 41, when open, provides access to the rolls 43 and 44 and the adjacent interior portions of the paper roll chamber, so that the threading of the paper strip past these rolls and into the mask is facilitated. Furthermore, the door 41 preferably carries on its inner side a freely revoluble or idler roll 45, the axis of which is in parallelism with the axes of the rollers 43 and 44 and the axis of the roller 45 on the door is located so that it will pass between the axes of the rollers 43 and 44 while the door is moving into its closed position, and when the door is fully closed, the roll 45 thereon will occupy a position inwardly beyond the rollers 43 and 44. The inward movement of the roller 45 incident to the closing of the door causes this roll to engage the part of the paper strip which extends between the rolls 43 and 44 and when the roll 45 is in its operative position, as shown in Fig. 5, the paper strip will bend sharply about the roll 45 in a direction opposite to that in which the paper strip was bent while in rolled form, and the effect of this relatively sharp reverse bending of the paper strip as caused by the roll 45 counteracts or removes the curling tendency of the paper strip caused by the rolling thereof. The idler rolls 43, 44 and 45 also cooperate to apply sufficient tension to the paper strip to maintain it in flat form in the mask. Turn buttons 41ᵃ serve to hold the door 41 in closed position.

The mask is also preferably mounted so that it may be swung into substantially the dotted line position, Fig. 5, to facilitate threading of the paper strip therein. For this purpose, the lower corners of the mask are pivotally or rockably mounted on the uprights 36, as, for example, by reducing the width of the lower end of the mask, thus forming shoulders 46 and providing brackets 47 on the inner sides of the uprights, these brackets having notches 48 therein in which the shouldered portions of the mask are adapted to rest. A stop 49 is preferably fixed on the inner side of each upright 36 to properly aline the mask with the opening 39 in the bottom of the paper-roll chamber, and a stop 50, for example, a screw, is preferably provided at the inner side of each upright 36 to limit the swing of the mask to the dotted line position, as shown in Fig. 5. The upper end of the mask is provided with suitable means for forming a light-tight joint with the paper-roll chamber 35 for the purpose of preventing undesirable exposure of the paper at this point. As shown, the upper edge of the plate 31 of the mask is formed with a divergent flange 51 which is arranged to engage the edge of a light-excluding strip 52 fixed to the bottom wall of the paper-roll chamber and the upper edge of the plate 30 of the mask is provided with an oppositely offset flange 53 which is adapted to overlap and form a light-tight joint with the door 41, when the latter is in closed position. Spring latches 54 fitted in the respective uprights 36 serve to retain the mask in operative position against the stops 49, and when the mask is in this position, the mask is held thereby in its operative position. The latches 54, however, may be readily pushed back by the mask when force is applied thereto to swing it from its operative position to the dotted line position shown in Fig. 5, or to remove the mask.

The paper strip P is arranged to be engaged at a point below the mask by feed rolls 55 and 56 which serve to feed or advance the paper strip at appropriate times, as will be hereinafter described. In order to prevent light striking the paper through the space between the lower end of the mask and these feed rolls, the lower edges of the plates 30 and 31 of the mask are provided with oppositely extending flanges 57 and 58 which are shaped to overlie the feed rolls 55 and 56 and to incline downwardly toward the outer sides of these rolls, these flanges, when thus shaped, serving to intercept any light admitted through the lens and which might otherwise strike the portion of the sensitized paper between the mask and the feed rolls.

The paper roll P' is preferably supplied to the machine on a spool 59 and one end of the paper roll chamber 35 is provided with an opening 60 through which the spool may be inserted or removed. The opposite end of the paper roll chamber is closed by a head 61 which may be formed as a part of the respective upright 36, as shown, and this head is provided with a bearing 62 in which a paper roll supporting shaft 63 is journaled. The shaft 63 is provided with means for preventing endwise movement thereof, it being shown in the present instance as extending outwardly beyond the head 61 and having a collar 64 fixed thereon. A cap 65 is fixed to the outer side of the head 61 and is formed with a recess 66 which accommodates the collar 64. The collar on the shaft is thus confined between the cap 65 and the head 61 and endwise movement of the shaft is prevented. The shaft, in the construction shown, is rotatable with the paper roll spool as the paper strip is unwound therefrom, and means is preferably provided for indicating to the operator of the machine whether paper is fed from the spool at the time each paper feeding operation takes place. For example, a toothed disk 67 is shown fixed to the shaft 63 and arranged to cooperate with a vibratory spring 68 which is fixed at one end to the head 61 by the bracket 69. Such a device will produce an audible signal, due to the striking of the free end of the spring 68 successively against the teeth of the disk 67, when the spool supporting shaft 63 rotates incident to the feeding of paper from the roll. When this signal is produced during the paper feeding operation, the operator will be thereby informed that paper is actually being fed from the roll, but if such signal is not produced at the time the paper feeding operation occurs, this will indicate to the operator that the supply of paper on the roll has become exhausted and requires replenishing.

The spool supporting shaft and spool are preferably so constructed that the spool will be centered longitudinally with respect to a median line of the strip, although spools of different lengths and containing paper strips of different widths may be used, the spool-centering means shown in the present instance being substantially the same as that fully disclosed in U. S. Patent No. 1,234,746, granted July 31, 1917, to E. B. Fish. For the present purposes, it is believed sufficient to state that the shaft carries a key-like member 70 which projects radially and extends longitudinally thereof, this key-like member being provided with radially-stepped longitudinally spaced shoulders or stops 71, the longitudinal spacing of the shoulders conforming with variations in the lengths of different spools and the radial spacing of the stops conforming with the radial length of slots 72 formed in the end plates of the different spools, the key-like member 70 being adapted to fit into the slot 72 of the spool and thereby form a driving connection between the spool and shaft 63 while the radial length of the slot 72 in the spool will determine which shoulder 71 will be engaged by the spool. Means is provided for holding the spool in centered position on the shaft and against the appropriate shoulder 71. For example, the shaft may be threaded as at 73 and a thumb nut 74 may be fitted to operate on this threaded portion and to abut against the spool and thereby retain the spool in operative position. The paper spool chamber 35 is closed and made light-tight by a removable cover 75 which is provided with suitable means for retaining it in closed position. As shown, the edge of the opening 60 which is adapted to be closed by the cover 75 is provided with a suitable number of circumferentially spaced notches 76 and spiral or cam-shaped surfaces 77 leading therefrom, and the cover 75 has fixed to its inner side a corresponding number of lugs 78 which have hooks or locking projections 79 adapted to engage behind a shoulder 80 which surrounds the opening 60. In using a fastening of this kind for the closure, the closure is applied to the end of the paper roll chamber 35 while the lugs 78 on the closure are in line with the notches 76, and after the closure has been fully applied, the closure is rotated through a partial revolution in a direction to cause the lugs 78 to ride over the spiral or cam-shaped surfaces 77, the hooks 79 on the lugs at this time being in a position behind or at the inner side of the flange 80. The spiral or cam-shaped surfaces 77 thus act upon the lugs 78 to center the cover 75 with respect to the shaft or axis of the spool while the hooks 79 engage behind or at the inner side of the flange 80 and thereby lock the cover in place.

The cover 75 is preferably provided with means operable from the exterior thereof for re-winding the unwound portion of the paper strip onto the spool, preparatory to the removal of the spool from the spool chamber, should such become desirable. As shown, the cover 75 is provided with a central hub or bearing 81 in which is rotatably fitted a stub shaft 82 which is preferably shorter than the length of the hub or bearing, thus enabling the adjacent end of the spool supporting shaft 63 to project partly into the hub, so that it will be supported or steadied thereby. The adjacent ends of the shafts 63 and 82 are preferably provided with clutch portions 83 which are adapted to engage and thus couple the shaft 82 to the spool shaft 63 when the cover 75 is in closed position, the clutch members disengaging when the cover 75 is removed. The outer end of the shaft 82 has a knob or hand-wheel 84 fixed thereon to provide means operable exteriorly of the spool chamber for rotating the spool shaft 63 in a direction to re-wind the paper strip. The shaft 82 is positioned longitudinally to engage the end of the shaft 63 and is held in coupled relation therewith while the cover 75 is closed by a cap 85 which is interposed between the hub of the hand-wheel 84 and a shoulder 86 formed on the shaft 82, this cap being threaded or otherwise fixed to the hub or bearing 81.

The exposure openings 34 in the opposite sides of the mask are so located that the axis of rotation of the turn-table, designated $x$—$x$ in Figure 6 bisects the width of these openings. In consequence, the exposure openings 34 will present equal halves thereof at opposite sides of the center or axis $x$—$x$ irrespective of which side of the mask is presented toward the lens. If it is desired to produce photographic prints of documents or other objects so that the prints will have blank or unexposed margins of equal width at their opposite vertical edges, the paper roll spool will be mounted in the roll chamber 35 so that the center of length of the spool will coincide with the axis $x$—$x$. The paper-guiding members 32 of the mask may then be of equal width and the paper strip will occupy such a position in the mask that the center of width of the paper will coincide with the center of width of the exposure openings 34 and the vertical margins of the strip will project to equal extents beyond the vertical edges of the exposure openings. The exposures made on the opposite sides of the paper will register correctly with one another, owing to the registration of the exposure openings 34 with one another and their symmetrical relation with the axis of rotation $x$—$x$, and the exposures on the paper will be centered between the vertical or longitudinal edges of the paper strip.

In other instances, such, for example, as where the resulting prints are to be bound into book form, it is desirable to provide a wider unexposed or blank margin along one edge of the sheet than the margin provided at the opposite edge thereof, although maintaining registration of the exposures made on the opposite sides of the sheet. In order to produce prints of this kind, the sheet-guiding members 32 of the mask are made of unequal width although they are spaced apart a distance substantially equal to the width of the paper strip, and the paper roll spool is so mounted in the roll chamber 35 that the center of length of the spool coincides with a median line drawn between the inner edges of the guiding strips 32. In Figure 6 the line y—y represents the median line between the inner edges of the strip-guiding members 32, and the spool is mounted in the chamber 35, so that the center of its length coincides with this line. The extent to which the line y—y is displaced with respect to the center of rotation x—x is equal to one-half of the difference in the widths of the margins that will be formed at the opposite edges of the prints. By thus offsetting the median line in the width of the paper strip relatively to the center of rotation of the mask while maintaining the exposure openings 34 of the mask in centered or symmetrical relation with the center of rotation, the exposures made on the opposite sides of the prints will register or coincide with one another, but a relatively wide margin will be formed on opposite sides of the print and along the same edge thereof, and this margin which will be masked or unexposed will facilitate binding of the prints in book form.

Means may be employed for rotatably connecting the upper portion of the structure comprising the uprights 36 and the paper roll chamber to the top of the casing in order to assist the turn-table in supporting these parts and to prevent tipping of such structure. As shown, the upper portions of the uprights 36 are rigidly connected by a bar 87 which is provided with an opening or bearing 88 which is coaxial with the center of rotation of the turn-table, and a pin 89 carried by a bracket 90 which is rigidly fixed to the top wall of the casing fits into the bearing 88 and thereby serves to prevent tipping of the roll-holding chamber and to assist the turn-table in insuring rotation thereof and the mechanisms mounted thereon, on a definite or fixed axis.

Means is provided for setting or positioning the turn-table whereby the paper sheet or strip contained in the mask will be held in a plane perpendicular to the optical axis of the lens or in the focal plane thereof. Where, as in the present instance, means is provided for consecutively presenting the opposite sides of a photographic sheet or strip sensitized on both sides, to the lens for exposure, means is provided for setting or positioning the turn-table at each half revolution in its rotation, at which points the sensitized sheet or strip will be positioned perpendicularly to the optical axis of the lens. In the construction shown in the present instance for accomplishing this result, an indexing ring 91 is fixed on the upper side of the turn-table, as by screws 92, the peripheral edge 93 of this ring being concentric with the axis of rotation of the turn-table. The indexing ring is provided at diametrically opposite points in its circumference with notches 94 and 95, one side of each notch being provided with a slope or bevel 94$^a$ or 95$^a$ leading to the respective notch, and a bolt 96 is adapted to ride upon the periphery 93 of the indexing ring and to engage in the notch 94 or 95 when the turn-table has reached one or the other of its positions where the paper sheet or strip in the mask is positioned perpendicularly to the optical axis of the lens. The bolt 96 is yieldingly pressed inwardly by a spring, as will be hereinafter described, so that it will automatically enter one or the other of the notches 94 or 95 when the turn-table reaches one of its two operative positions, the turn-table being thereby automatically arrested in its rotation and locked so that the paper sheet or strip will be held accurately in proper exposing position. The turn-table and indexing ring rotate in an anti-clockwise direction in Fig. 4, and the sloping portions 94$^a$ and 95$^a$ serve to reduce the depth of the leading edges of the notches 94 and 95 and thus facilitate the engagement of the indexing or locking bolt 96 therein. A felt or other lubricant-absorbing wiper 97 is preferably arranged to bear on the periphery 93 of the indexing ring and thereby relieve the friction produced by the riding of the end of the bolt 96 thereon. This felt body will be able to retain a supply of lubricant and to apply it to the indexing ring, and the felt body may be maintained in contact with the indexing ring by mounting it on a thin sheet metal or other resilient bracket 98 so that the felt body will be maintained in contact with the indexing ring.

When photographic paper sensitized on both sides is used in the machine, the bolt 96 will engage in the notches 94 and 95 successively and thereby arrest the rotation of the turn-table at each half revolution thereof. In some instances, it may be desirable to use photographic paper sensitized on one side only, and when such paper is used, the operation of the machine will be facilitated and the speed of operation increased by causing the bolt 96 to engage only in the notch 94 to correspond with the positioning of the turn-table where the front or sensitized surface of the sheet is presented toward the exposing lens; in other words, to permit a complete revolution of the turn-table at each operation thereof. For such purposes, a switch 99 is provided, it comprising a plate having segmental slots 100 in which operate screws 101 fixed to the upper side of the indexing ring so that the plate may be shifted in a direction circumferentially of the ring and a pin 102 is provided which extends through the switch plate and is adapted to engage in one or another of a pair of holes 103 in the indexing ring, according to the position occupied by the switch plate. The switch plate is provided with a notch 104 and a sloping surface 104ᵃ corresponding with the notch 95, and its sloping portion 95ᵃ, and these notches and their sloping portions are arranged to register when the switch plate is in one position, as, for example, the full line position shown in Figure 31, but the notch 104 and sloping portion 104ᵃ of the switch plate are carried out of register with the notch 95 and its sloping portion 95ᵃ when the switch plate is shifted to its other position, as, for example, is shown by the dotted lines in Figure 31, the peripheral portion of the switch plate which is concentric with the periphery of the indexing ring then bridging the notch 95 and the sloping portion 95ᵃ of the indexing ring and preventing the bolt 96 which is adapted to ride on the switch plate from entering the notch 95 in the indexing ring. In consequence, the turn-table will revolve through a complete revolution after it is released by the withdrawal of the bolt 96 from the notch 94, and, hence, the turn-table will operate to successively position the sensitized side only of the photographic sheet to the lens.

Means is provided for operating the feed rolls 55 and 56 to advance the paper strip and thus bring the exposed portion or section thereof into position for delivery and to bring an unexposed section of the strip into position for exposure. Preferable, the strip-feeding operation is timed to take place during the second half or final portion of each rotation of the turn-table so that the strip will be advanced after the exposing operation or operations thereon have been completed. In the construction shown in the present instance, the final portion of each revolution of the turn-table is utilized to effect the operation of the feed rolls.

The feed roll operating means as shown in the present instance comprises a shaft 105 (Figs. 10 and 12) which is journaled in a bracket 106 fixed to the turn-table 21, this shaft having a pinion 107 fixed on its lower end and arranged to mesh constantly with a ring gear 108 which is fixed to the base 6 and surrounds a central opening 109 therein which has a diameter sufficiently large to permit the paper strip to project therethrough and to rotate therein without interference. The upper end of the shaft 105 has a gear 110 fixed thereon, said gear meshing with a gear 111 which is fixed on the shaft 112 of the feed roll 56. The shaft 112 of the feed roll 56 has a gear 113 fixed thereon and arranged to mesh with a gear 114 fixed on the shaft 115 of the cooperative feed roll 55, so that when the feed roll 56 is rotated by the gearing described, the companion feed roll 55 will be rotated at the same time but in a relatively reverse direction, it being understood that the feed rolls will rotate in a direction to feed the paper strip passing between them, in a downward direction. The shaft 112 of the feed roll 56 is mounted at its ends in suitable brackets 116 and 117, these brackets being fastened to the upper side of the turn-table by screws 118, or other suitable means, the passageway between the feed rolls being located above the slot or opening 40 in the turn-table, so that the feed rolls will direct the paper strip into and through this slot. As the gear 108 around which the pinion 107 travels concentrically is fixed to the base 6 while the shaft 105 to which the pinion 107 is fixed is carried by the turn-table, it will be understood that rotation of the turn-table relatively of the base will cause the shaft 105 to rotate on its axis, due to the travel of the pinion 107 around the gear 108, and the consequent rotation of the gear 110 will be transmitted to the feed rolls 55 and 56, causing them to rotate concurrently in a direction to feed downwardly the strip of paper which passes between them. The feed rolls are yieldingly pressed, one toward the other, to effect the necessary grip upon the paper strip to advance it, by springs 119 which are connected to the respective uprights 36 by pins 120, the opposite ends of the springs being connected to arms 121 which form parts of a pair of brackets 122, the latter being pivoted to the brackets 116 and 117 by the screws or equivalent means 123. Arms 124 forming parts of these brackets support and carry the ends of the shaft 115 of the feed roll 55 so that the normal action of the springs 119 is to yieldingly press the feed roll 55 against the paper sheet which extends between this feed roll and the cooperating feed roll 56 and to maintain sufficient grip or pressure on the paper strip to insure feeding thereof without slippage when the feed rolls are rotated.

The present invention provides means whereby the length of the photographic strip fed or advanced after each exposing operation may be varied or adjusted according to the dimensions of the prints to be made, and after each adjustment the strip feeding mechanism will operate to accurately feed a constant or invariable length of the strip. For this purpose, means is provided for varying the period during which the feed rolls 55 and 56 are in feeding relation and to thus govern the length of the strip to be advanced at each feeding operation. As shown, the brackets 122 which carry the ends of the feed roll 55 are provided with fingers 125, and a shaft 126 is fitted rotatably in the end brackets 116 and 117 and has dogs 127 fixed thereon and arranged to bear against the fingers 125 when the shaft 126 is rotated in an appropriate direction, lifting of the fingers 125 by the dogs 127 causing the feed roll 55 to retract with respect to the feed roll 56 and thereby discontinue the feeding operation. The shaft 126 is controlled by an arm 128 which is fixed on the outer end thereof, and the arm 128 is controlled by a cam on the upper edge of the base 6. As shown, the arm 128 is adapted to ride upon an elevated portion 129 on the upper edge of the base 6, at which time the feed roll 55 will be held in non-feeding position and also upon a relatively depressed portion 130 on the upper edge of the base, at which time the dogs 127 will be inactive and the springs 119 will hold the feed roll 55 in feeding relation with the companion feed roll 56. The feed roll controlling finger 128 is thus controlled and operated during the rotation of the turn-table with respect to the relatively fixed base, and it is preferable to so locate the incline 131 which connects the elevated part 129 to the relatively depressed portion 120 on the base that the feeding operation will be initiated after the turn-table has completed a half revolution in its operation or has passed the point at which the back of a double sensitized sheet is presented to the lens for exposure, and the feed rolls will be separated to release the paper strip and thus interrupt the feeding operation before the turntable has made a complete revolution. By causing the feed rolls to release the paper strip subsequently to each feeding operation, the paper strip is permitted to readjust or center itself, thereby avoiding waste of paper as heretofore experienced and to the drifting of the paper strip to one side of the center line of the paper passageway.

In order to vary the length of the paper strip advanced during each feeding operation, the effective length of the depressed portion 130 with which the finger 128 engages while the feeding operation is taking place, is made variable. This is done in the present instance by fitting a segmental cam member 132 to the outer circumference of the annular portion of the base 6, so that this cam member may be rotated circumferentially and thus caused to lengthen or shorten the relatively elevated cam portion 129. The portion of the cam member 132 adjacent to the relatively depressed cam portion 130 is provided with an incline 133 up which the finger 128 may ride and thus interrupt the feeding operation when the finger 128 reaches the end of the cam portion 130. The cam portion 132 may be mounted in different ways, it being shown in the present instance, as provided on its inner side with a rib 134 which is adapted to fit into a circumferential groove 135 formed in the outer periphery of the circular portion of the base 6, and a guard plate 136 may be applied to the outer circumference of the circular portion of the base 6 so that it overlaps an edge of the cam portion 132, thereby retaining the rib 134 thereon in engagement with the groove 135. The cam member 132 is provided with a slot 137 which extends through a suitable portion of its length for a purpose which will hereinafter appear.

Means is provided for adjusting the cam member 132 circumferentially to vary the length of the paper strip fed at each feeding operation, such adjusting means being operable from the exterior of the casing of the machine, and means is also preferably provided for indicating the different lengths of the paper strip to be fed according to the different settings of the cam member 132. As shown in Figures 19 and 21, the cam member 132 has a gear segment 138 extending for a suitable distance around its circumference, and this gear segment meshes with a gear 139 which is mounted to rotate on a shaft 140, the latter being supported by a suitable bracket 141 mounted on a portion of the base 6. The gear 139 has a bevel gear 142 pinned or otherwise fixed to turn therewith, and this bevel gear meshes with a bevel pinion 143 which is fixed on the inner end of a shaft 144, the latter being also journaled in the bracket 141. The shaft 144 extends outwardly through the front wall of the casing and has an operating crank or handle 145 fixed thereon. Rotation of the handle 145 serves to operate the gears 139, 142 and 143 to rotate the cam member 132 in a direction circumferentially of the circular portion of the base 6 on which the finger 128 travels, thereby increasing or decreasing the length of the relatively depressed portion 130 of the cam, which lies between the inclines 131 and 133, thereby varying the distance the finger 138 travels along the relatively depressed cam portion 130. As the feed roll 55 is in feeding relation with the feed roll 56 only while the finger 128 is travelling along the relatively depressed portion of the cam, it will be understood that the lengthening or shortening of this depressed portion of the cam by circumferential movement of the cam member 132 in one direction or the other will serve to vary the length of the paper strip advanced at each feeding operation. The length of the paper strip to be advanced at each feeding operation, according to the setting of the cam member 132, is preferably indicated by a pointer 146 which is located on the front wall of the casing at a point where it can be conveniently observed by the operator, this pointer being fixed to the forward end of a shaft 147 which extends rearwardly through a suitable bearing 148 mounted on the wall of the casing, the inner end of this shaft having a relatively large gear 149 fixed thereto and arranged to mesh constantly with a pinion 150 which is fixed on the crank shaft 144. The ratio of the gear 149 and pinion 150 is such that the pointer 146 will serve to indicate on an appropriately graduated dial or scale 151 on the front of the machine the different lengths of the paper strip which will be fed by the feed rolls according to the different settings of the cam member 132 through the operation of the crank 145.

A knife or equivalent severing device is provided for severing the exposed section of the paper strip from the remainder thereof after the exposing operation or operations have been performed thereon. Preferably, the knife is provided with means for actuating it or for timing its operation so that the exposed section of the paper strip will be severed after the feed mechanism has advanced the exposed section to a position for delivery and immediately prior to the return of the turn-table to its initial position as the result of a complete revolution thereof.

As shown in the present instance, the knife is mounted on the upper side of the turn-table and arranged to operate upon a portion of the paper strip which extends through the slot 40 in the turn-table. The knife comprises preferably a bar 151 which is fixed to the upper side of the turn-table by screws 152 or equivalent means, this bar extending longitudinally along and partly overhanging one edge of the slot 40. The upper side of the bar 151 is recessed at 153 to receive a rail 154, this rail being fixed to the bar 151 by screws 155. The portion of the bar 151 beneath the rail 154 is cut away at 156 to a level below the bottom of the recess 153 to provide a slot 157 between the bar 151 and the rail 154 to receive the knife bar. A groove 158 is preferably provided in the bar 151 behind the portion 156 thereof, this groove extending longitudinally of the bar 151 and providing a clearance space to receive dust, lint, oil, or other débris, which tends to accumulate in the slot 157 and which ordinarily would impair the efficiency of the severing operation thereof, this groove, however, serving to receive such débris and thus enable its removal from the knife slot.

A pair of guides 159 extend in parallel relation from the opposite ends of the bar 151 and in directions past the ends of the slot 40 in the turn-table, and these guides are formed with grooves 160 to receive ribs or tongues 161 on the respective ends of a reciprocatory knife bar 162, the latter being thus guided to move in a direction toward and from the stationary knife bar 151. This movable knife bar carries a knife blade 163 which is preferably of the type having a serrated cutting or severing edge 164. The knife blade is preferably mounted with respect to the knife bar 162 by forming the latter with a longitudinal recess 165 along its forward edge on which the knife blade is seated, and the knife blade is held in fixed relation to the reciprocatory knife bar by a securing rail or strip 166 which bears along its forward edge on the upper side of the knife blade and bears at its rear edge against a shoulder 167 which is located at a height above the bottom of the recess 165 equal to the thickness of the knife blade. The securing rail or member 166 is fastened to the knife bar 162 by a suitable number of screws 168 which serve to clamp the rail 166 against the knife blade and thereby secure the latter firmly in position. The rear edge of the knife blade is preferably provided with recesses or notches 169 to accommodate the screws 168. In order to increase the security with which the knife blade is fastened to the knife bar 162, the knife blade may be provided with a suitable number of holes 170 arranged to register with and receive dowel pins 171 fixed to the bar 162. These pins, when used, will positively lock the knife blade so that it will be incapable of displacement in any direction in respect to the knife bar 162, and the knife blade is thus enabled to retain its correct operative position notwithstanding severe service conditions to which it may be subjected.

It will be understood that the knife bar 162 is normally retracted with respect to the relatively fixed bar 151, as is shown in Figure 15, a portion of the paper strip then extending downwardly through the space provided between the severing or cutting edge of the knife and the opposed bar 151 and rail 154. Severing of the paper strip is effected by movement of the knife blade toward the right in Figure 15, the severing edge of the knife blade being thus forced into and through the paper strip and thereby severing it on a line which is square or perpendicular to the length of the strip. The cutting edge of the knife blade enters the slot 157 during the performance of the strip-severing operation, and in order to prevent blocking of the cutting edge of the knife on the lower wall 156 of the slot, due to wear of the parts which ordinarily tends to lower the elevation of the knife blade, it is preferable to form a bevel 172 on the cutting edge of the knife at the lower side of the knife blade, as is shown in Figure 16, and also in Figure 17, which is a view of the under side of the knife blade. This bevel will compensate for any downward displacement of the knife blade, due to wear of the parts, or other causes, as the bevel would then engage the lower edge of the slot 157 as the cutting edge of the knife blade is about to enter the slot, and the bevel riding upon the lower edge of the slot will insure entrance of the knife blade in the slot without obstruction. It is also preferable to provide the rail 154 at the upper side of the knife blade slot 157 with a lip 173 which projects forwardly from or overhangs the forward edge of the bar 151. This lip, when used, will prevent the curled or creased edge which is occasionally formed on the severed edge of the paper, due to the drawing of this portion of the paper into the slot 157 by the severing action of the knife blade, from catching on the lower edge of the slot 157, thereby avoiding interference with the next following feeding operation of the strip, it being noted that the lip 173 projects beyond the edge of the bar 151 which is beneath it and, hence, the lip will hold the edge of the paper above the slot 157 in a position removed from the lower edge of the slot so that it cannot catch thereon when the strip is fed downwardly. The knife bar 162 and knife blade 163 may be actuated at appropriate intervals by different mechanisms, but it is preferable to provide means for automatically actuating the knife bar and knife blade incident to the rotation of the turn-table and at a point in the rotation of the turn-table which immediately precedes the completion of each revolution thereof or the return of the turn-table to its initial position. The mechanism shown in the present instance for accomplishing this result comprises a link 174 which is pivotally connected at 175 to the reciprocatory knife bar 162 and is pivotally connected at 176 to a lever 177. The lever 177 is pivotally mounted at 178 on a suitable bracket 179 which is fixed on the upper side of the turn-table, and the lever 177 carries a roller or projection 180 which is normally pressed outwardly with respect to the axis of the turn-table by springs 181 which are attached at 182 to the knife bar and are fixed by the pins 183 to the turn-table. The springs 181 act to normally hold the knife bar 162 and the knife blade in retracted position, as shown in Figures 14 and 15, the knife then providing a passageway through it for the paper strip. A suitably shaped cam 184 is fixed to the non-rotatable turn-table base 6 in the path of the roller 180, this cam being located at such a point in the circumference of the base that it will be engaged by the roller 180 immediately before the turn-table reaches the end of a complete revolution. The cam 184 is so shaped that as the roller 180 rides thereon, the lever 177 and the link 174 attached thereto will be forced inwardly against the action of the springs 181, and the knife bar 162 and the knife blade 163 will be thereby caused to perform a severing operation upon the paper strip. As the rotation of the turn-table continues to complete a revolution thereof, the roller 180 passes off the end of the cam 184, and the springs 181 will then be free to immediately retract the knife bar 162 and knife blade 163, thus preparing the knife for the next feeding operation during which the paper strip passes downwardly through the knife.

Means is preferably provided for maintaining parallelism between the reciprocatory knife bar 162 and knife blade 163 carried thereby and the relatively fixed knife bar 151 and rail 154 whereby the severing of the paper strip will take place uniformly and at the same time throughout the length of the knife blade. For this purpose, equalizing means is provided in the present instance which comprises a shaft 185 which is journalled at its ends in bearings formed in suitably shaped brackets 186 which are fixed to the upper side of the turn-table. Gear segments 187 are fixed on this shaft toward its opposite ends so that they will rotate in unison with the shaft, and these gear segments mesh with racks 188 which are slidable in guiding grooves 189 formed in the respective brackets 186, the racks being operatively connected at 190 to the reciprocatory knife bar 162 at points toward or near its ends. By providing equalizing means, as described, the reciprocatory movements of the knife bar and the knife blade carried by it will take place uniformly throughout the length thereof, so that the knife blade will be maintained in parallelism with the cooperative fixed members of the knife.

Buffers are preferably employed for cushioning the retracting or return movements of the knife bar under the action of the springs 181, when the roller 180 passes and is thus freed by the cam 184. As shown, a plunger 191 is fitted to operate in a bore 192 formed in each bracket 186 in a direction parallel with the direction of reciprocation of the knife bar, and each plunger is yieldingly forced toward the adjacent edge of the knife bar 162 by a compression spring 193 which may be contained in the bore 192 behind the plunger. These plungers which are arranged to be engaged by the knife bar 162 as the latter is retracted and serve to arrest the sudden retraction of the knife bar without shock, also serve to set the knife bar 162 in its retracted position, as the springs 193 of the plungers oppose and are stronger than the retracting springs 181. For this purpose, means is provided for limiting the movement of the plungers 191 under the action of their springs 192, so that these plungers may act as gauges to determine the position in which the knife blade will be held by the springs 181. As shown, each plunger 191 is provided with a stem 194 which operates freely through the end of the respective bracket and the stem is provided with adjusting and operating nuts 195 which are adapted to abut against the bracket and to thus limit the movement of the respective plunger under the action of its spring. The nuts 195 may disengage momentarily from the respective brackets under the impact incident to the return of the knife blade to its retracted position, but these nuts will immediately be re-engaged with the brackets under the action of the springs 193, and the plungers 191 which engage the edge of the knife bar 162 will thus be set in proper position to act as gauges to determine the retracted position of the knife bar.

The present invention provides means for indicating the position occupied by the turn-table, thus informing the operator whether the turn-table occupies its initial position so as to present the front half or side of the sensitized sheet or strip to the camera lens, or whether the turn-table has made a half revolution so as to present the back half or side of the photographic strip to the exposing lens. The operator will thus be enabled to determine immediately when the turn-table has properly completed the first and second halves of its revolution as occurs in the consecutive exposing of the opposite sides of a photographic strip sensitized on both sides, and to determine whether the turn-table has completed each revolution thereof incident to the exposure of the front side only of a photographic strip sensitized on one side only. When the indicating means shows that the turn-table has completed the second half of its revolution, the operator will be informed that the exposed section of the strip has been fed forward or advanced for delivery, and that this section of the strip has been severed from the remainder of the strip, as the strip feeding and severing mechanisms, according to the structure hereinbefore described, operate automatically during the second half of each revolution of the turn-table.

The indicating means, as shown in the present instance, comprises a pair of targets 196 and 197, these targets being fixed on stems 198 and 199 which are guided by a suitable bracket 200, so that they will reciprocate through the front wall of the casing of the machine. A housing 201 is preferably secured to the front wall of the casing to enclose the targets, the front of this housing having sight openings 202 and 203 through which the respective targets 196 and 197 may be observed when such targets are in their forward or indicating position. For example, in Figure 21, the upper target 196 is in its forward or indicating position and it is immediately behind the sight opening 202, so that it may be seen or observed by the operator occupying his usual position in front of the machine; while the other target 197 is in its retracted or non-indicating position at some distance in rear of its sight opening, and, hence, this target cannot be seen or observed by the operator occupying his usual position. The face of each target may bear a card or label 204 having appropriate indicia thereon which will inform the operator of the significance of the indications produced by the targets. For example, the card or label on the upper target may bear the indicia illustrated in Figure 20, which indicates that when this target is in its forward or indicating position, the front side of the photographic strip is presented to the exposing lens, and the indicia on the target 197, as shown in Fig. 20, will indicate that the second or backside of the photographic strip is presented to the exposing lens.

The indicating targets are provided with means for setting or actuating them automatically in accordance with the movements of or the positions occupied by the turn-table, the target 196 being set in indicating position and held in such position while the turn-table is in its initial position so that the front side of the photographic strip is presented to the exposing lens, the target 197 at this time being in non-indicating position, and the target 196 being caused to move into its non-indicating position and the target 197 being set in indicating position when the turn-table has rotated a half revolution or through an angle of 180° from its initial position, the back or rear side of the photographic strip being then presented to the exposing lens. The means shown in the present instance for automatically setting the targets comprises a pair of cam levers 205 and 206 which are pivotally mounted at 207 to a suitable bracket 208 which is fixed to the inner side of the front wall of the casing, this bracket being preferably formed with a rib 209 which is provided with slots 210 and 211 in which the cam levers 205 and 206 are guided. The cam levers 205 and 206 are provided with heels 212 and 213 which are arranged to bear against the inner ends of the stems 198 and 199 of the targets 196 and 197, respectively. The stems 198 and 199 are yieldingly pressed inwardly against the respective heels 212 and 213 by compression springs 214 and 215. The targets are automatically timed and set by rollers or projections 216 and 217 which are carried by brackets 218 and 219 fixed at diametrically opposite points on the indexing ring 91 which is carried by the turn table. The roller 216 which is arranged to cooperate with the cam lever 205 is located on a level with this cam lever, while the diametrically opposite roller 217 which is arranged to cooperate with the cam lever 206 is offset below the cam lever 205 so that it will be on a level with the lower cam lever 206. By this arrangement of the rollers 216 and 217, the roller 216 will be able to operate only on the cam lever 205 for the target 196 while the roller 217 will be able to operate only on the cam lever 206 for the target 197. The rollers 216 and 217 are so positioned around the circumference of the indexing ring with respect to the location of the cam levers 205 and 206 in the casing that the roller 216 will reach the cam lever 205 and will remain in engagement therewith when the turn-table assumes its initial position so as to present the front side of the photographic strip to the exposing lens, the parts being shown in this position in Figure 4, and the roller 217 will reach and will remain in engagement with the cam lever 206 when the turn-table has completed a half revolution, or has been rotated through an angle of 180° from its initial position so as to present the rear side of the photographic strip to the exposing lens. The springs 214 and 215 act to yieldingly press the cam levers 205 and 206 inwardly or into the paths of the rollers 216 and 217, respectively, and the surfaces of these cam levers which are engaged by the respective rollers are so shaped that when each cam lever is engaged by its respective roller, such cam lever will be swung outwardly, causing the heel thereon to bear on the inner end of the stem of the respective target and to thereby push the corresponding target forwardly or into its indicating position against the action of its retracting spring, the other target at this time being in its retracted or non-indicating position and being held in such position by its spring, as the setting or actuating roller for that target will be at the opposite side of the turn-table.

The turn-table is driven or rotated preferably through mechanical or power-driven means under the control of the operator, the present invention providing power-driven or mechanically-operated means for driving the turn-table which is releasable by the operator to set it into operation, and after it has been set into operation, it will continue its operation until automatically arrested or stopped upon completion of the operation or operations of the turn-table. The driving and controlling means provided by the present invention is illustrated generally in Figs. 1 and 4 and in detail in Figures 24 to 26, inclusive, and 28. The power mechanism is operatively connected to the turn-table by a gear 220 which projects through the slot 137 in the cam member 132 so that it will avoid interfering with the adjustment of this cam member, and it extends through an opening 221 formed in the annular base member 6 on which the turn-table is mounted, the turn-table being provided with peripheral gear teeth 222 which mesh constantly with this gear 220. The gear 220 and the operating and controlling mechanism therefore are preferably housed in a gear casing 223 which may be formed separately from the main casing of the machine but bolted or otherwise secured to a side thereof as will be clear from Figures 1 and 4. The gear casing, which may be conveniently formed of upper and lower sections 224 and 225 fastened together by screws 226 or other suitable means contains a shaft 227 which is fixed preferably in the lower section of the gear casing and projects upwardly therefrom to provide a journal on which the gear 220 may revolve freely, a collar 228 fixed on the upper end of this shaft serving to prevent vertical or end play of this gear. The upper end of the shaft 227 may be formed with an oil passage 229 which leads to the hub or bearing surface of the gear, and an oil tube 230 which may extend through the upper section of the gear case may be employed to supply lubricant to the oil passage 229.

Means operative under the control of the operator is provided for driving the gear 220 and the turn-table connected thereto to effect reversals of the paper strip. In the present instance, such means comprises a gear 231 which meshes constantly with the gear 220 and is frictionally driven from a clutch member 232, the latter being mounted on a bushing 233, which, in turn, is loosely mounted on a shaft 234 which is journaled in bushings 235 and 236 provided in the upper and lower sections of the gear case. The gear 231 is capable of rotation relatively to the clutch member 232, but it is frictionally driven therefrom through friction disks 237 and 238 of suitable material which are interposed between the web of the gear 231 and the clutch member 232 and a clutch ring 289. The clutch disks are maintained under sufficient pressure to effect a drive between the clutch 232 and the gear 220 by a spring 240 which, in the present instance, encircles a sleeve-like portion 241 forming part of the clutch member 232, one end of this spring bearing against the clutch ring 239 and its opposite end bearing against a collar 242 which is fixed on the sleeve 233. The clutch ring 239 is keyed or connected to rotate with the clutch member 232 by a pin 243 which engages in a key-way 244 formed in the hub of the clutch ring. The clutch member 232 is provided with jaws 245 through which it is driven. The shaft 234 which is adapted to be revolved continuously under power while the machine is in use, as will be hereinafter described, serves to operate the gear 231 through the medium of the clutch member 232 under control of a cooperative clutch member 246 which is splined on the shaft 234 by the spline 247 so that it may be shifted longitudinally of the shaft to engage and disengage the clutch jaws 248 thereon with respect to the clutch jaws 245 of the clutch member 232, and as the shiftable clutch member 246 is always connected to revolve with the shaft 234, it will transmit motion from said shaft to the clutch member 232 when the clutch members 246 and 232 are engaged, and the clutch member 232 will then drive the gear 231 through the friction drive described.

The controlling clutch member 246 is provided with means operative at the will of the attendant of the machine to set it in driving relation with the clutch member 232. In the construction shown, the clutch member 246 is grooved circumferentially to receive the fork of a shifting member 248ª, and the shifting member has a hub 249 which is fixed by the pins 250 or other suitable means to a reciprocatory rod 251. This rod is fitted to slide in bearings or bushings 252 provided in the upper and lower sections of the gear case, and a spring 253 which bears at one end against the lower bushing 252 and at its upper end against the hub 249 of the shifting member serves to yieldingly shift the clutch member 246 into its upper position where it is disengaged from the clutch member 232. The shifting rod 251 is provided with controlling means which is located within convenient reach of the operator while occupying his usual position in front of the machine. In the present instance, the clutch shifting rod 251 is connected to a rod 254 which extends downwardly toward the base of the machine and is there pivotally connected to a bell-crank lever 255 which is pivoted at 256 to a bracket 257 which is bolted or otherwise fixed to one of the base rails 4, (see Fig. 27). The other arm of the bell-crank lever 255 is connected by a forwardly extending rod 258 to a lever 259, the latter being fixed on a shaft 260 which may be journaled at its ends in the base rails 4, (as shown in Fig. 1). The shaft 260 has a pedal 261 fixed thereon at a point in its length which renders the pedal conveniently accessible for depression by the foot of the operator. A spring 262 which is connected at one end to the lever 259 and at its other end to the adjacent base rail 4 acts normally to raise the pedal 261 and to push upwardly the rod 254 and the shifting rod 251 to which it is connected, the spring 262 thus assisting the spring 253 in returning the clutch member 256 to its disengaged position and for normally holding it in such position. However, when the pedal 261 is depressed by the operator after an exposing operation has been completed, the rod 254 and the shifting rod 251 connected thereto will be drawn downwardly, in consequence of which the clutch member 246 on the revolving drive shaft 234 will be lowered into driving relation with the clutch member 232, with the result that the turn-table will be rotated through the driving gear 231 and the interposed gear 220.

Before the turn-table can be rotated out of either position in which it may be set and locked by the bolt 96, it is necessary to retract this bolt from the notch 94 or the notch 95 of the indexing ring, according to which of these notches is engaged by the bolt. The present invention provides means whereby the bolt 96 is automatically disengaged from one or the other of these notches in the indexing ring in advance of or preparatory to the driving engagement of the clutch members 232 and 246; in other words, the turn-table positioning and locking bolt is retracted automatically as a result of depression of the pedal 261. In the construction shown in the present instance for accomplishing this purpose, the bolt 96 is fitted to reciprocate in a guiding groove 262 formed in a bracket 263 which is attached to or formed as a part of the gear casing 223, the bolt being provided at one side with rack teeth 264 which cooperate with a gear sector 265. This gear sector is fitted to rotate on a shaft 266, the ends of which are mounted in the bracket 263, and a second gear sector 267 which may be formed integrally with or otherwise fixed to the sector 265 is provided, this sector 267 meshing with rack teeth 268 which are formed on the hub 249 of the shifting member 248. When such a structure is employed, the initial part of the down-stroke of the shifting rod 251 (Fig. 25) caused by depression of the pedal 261, will cause the rack 268 to move downwardly and thereby rotate the cooperating gear sector 267, the gear sector 265 which operates in unison therewith and which engages the rack teeth 264 on the bolt 96 acting to retract the end of this bolt from the positioning notch in the index ring 91. Further downward movement of the pedal 261 brings the clutch member 246 into driving engagement with the clutch member 232. It will be understood that sufficient lost motion is provided for the clutch member 246 to enable the bolt 96 to be partly disengaged from the notch in the indexing ring before this clutch member establishes a driving connection with the clutch member 232, although the friction drive provided between the clutch member 232 and the gear 231 will slip momentarily and thus delay rotation of the turn-table until after the bolt 96 has been fully disengaged from the notch in the indexing ring.

The operation just described unlocks the turn-table and establishes a driving connection between it and the drive shaft, so that the turn-table will be promptly set into rotation to remove one side of the photographic strip from a position opposite to the exposing lens and to bring the opposite side of the strip into such position. Immediately after the pedal 261 has been depressed it may be released by the operator as the withdrawal of the bolt 96 from the notch in the indexing ring and the immediate coupling of the turn-table to its driving means will rotate the turn-table so as to carry the notch beyond the locking bolt, and when the pedal 261 is released the end of the locking bolt will engage the peripheral edge of the indexing ring and the bolt will be thereby held in its retracted position, although it is pressed yieldingly against the periphery of the indexing ring by the spring 253, assisted by the spring 262. While the bolt 96 is thus held in retracted position, the clutch shifting member 248 is held in its depressed position and the clutch member 246 is consequently held in driving relation with the companion clutch member 232. The driving connection between the shaft 234 and the turn-table is thus maintained until the next notch in the indexing ring reaches the bolt 96. At this moment, the bolt will enter this notch and its inward movement under the action of the spring 253 will cause the clutch shifting member 248 to be shot upwardly, thereby immediately disengaging the clutch member 246 from the cooperative clutch member 232. The turn-table is thus arrested automatically in its rotation and it is set to position the photographic strip for the next exposure. Any over-motion transmitted to the clutch member 232 from the clutch member 246 incident to the stoppage of the turn-table will be compensated for by the friction drive provided between the driven clutch member 232 and the gear 231.

Figure 4:
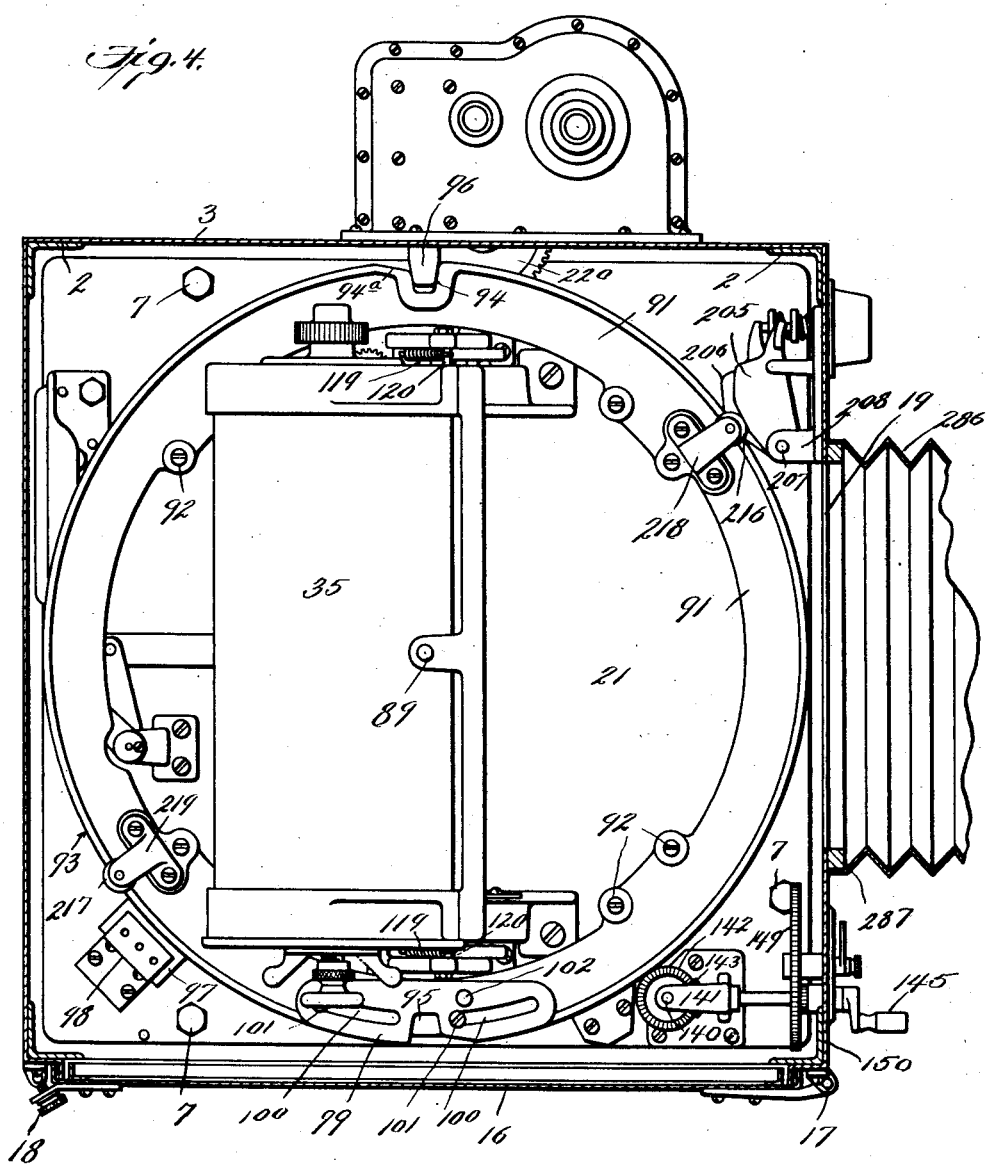
Figure 4 represents a cross-section through the upper portion of the machine taken on the line 4—4 of Figure 2.
Figure 31:
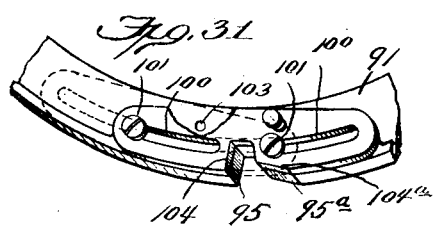
Figure 31 is a detail view of a fragment of the indexing ring on the turn-table, showing a switch thereon.

When the opposite sides of the photographic paper sensitized on both sides are to be exposed consecutively, the switch 99 (Figs. 4 and 31) will be set in the full line position shown in Figure 31, so that the notch 95 in the indexing ring is open or capable of being engaged by the bolt 96. The initial or starting position of the turn-table is shown in Figure 4, the bolt 96 then engaging the notch 94. Upon completion of the exposure of the front side of the double sensitized strip, the pedal 261 is depressed, whereupon the bolt 96 will be retracted and the power drive connected to rotate the turn-table. The turn-table will continue to rotate until it has completed substantially a half revolution, this bringing the other notch 95 in the indexing ring into a position to receive the bolt 96, and as the bolt enters this notch, the rotation of the turn-table will be arrested and the power drive will be interrupted. This half revolution of the turn-table brings the second or rear side of the double sensitized photographic sheet into a position opposite to the lens for exposure, and after the exposure has been made, the pedal 261 is again depressed, whereupon the bolt 96 is retracted from the notch 95 and the power drive is again connected to the turn-table, whereby the latter is driven on the second half of its revolution, and when the notch 94 reaches the bolt 96, the latter engages therein, thereby stopping the turn-table in its initial or starting position and locking it in such position, and at the same time, interrupting the power driving connection with the turn-table. When photographic paper sensitized on one side only is to be exposed, the switch 99 is set in the dotted line position represented in Figure 31, so that the peripheral edge of the switch bridges the notch 95. The bolt 96 is then capable of engaging only in the notch 94, and when so engaged, the turn-table is positioned so that the sensitized side of the photographic sheet is opposite to the exposing lens. In this case, after exposure has been made, the pedal 261 is depressed, thus retracting the bolt 96 from the notch 94 to unlock the turn-table and to establish the power driving connection therewith, but the consequent rotation of the turn-table will continue through a complete revolution or until the notch 94 returns to a position to receive the bolt 96, whereupon the turn-table will be stopped by the bolt and the power driving connection therewith interrupted. The notch 95 in the indexing ring passes the bolt 94 in this instance without receiving the bolt, as the bolt is prevented from engaging in this notch by the switch 99 which bridges it.

The shaft 234, during the operation of the machine, is driven continuously, preferably by power derived from an electric motor. As shown in the present instance, (Figs. 1 and 28), the lower end of the shaft 234 is connected through a shaft 269 to suitable reduction gearing contained in a gear case 270 and driven from an electric motor 271. The gearing and motor are preferably mounted on a base 272 which is separate from the casing or cabinet of the machine in order to avoid transmission of any vibration incident to the operation of the motor or gearing to the machine. The stand 272 supporting the gearing and motor are also preferably offset toward the rear of the machine with respect to the upper gear case 223 in order to avoid obstructing the portion of the floor adjacent to the machine and thus avoid interference with the movements of the operator. To compensate for the offsetting of the motor driven gearing, the upper end of the shaft 269 is connected to the shaft 236 by a flexible or universal joint 273 of a suitable type, and another universal joint 274 connects the lower end of the shaft 269 to the shaft 275 of the gearing contained in the gear case 270. This gearing comprises a relatively large bevel gear 276 which is fixed to the shaft 275, the latter being suitably journaled in the gear case, and a bevel pinion 277 which meshes with the gear 276 and is fixed on a shaft 278, the latter being suitably journaled in the gear case 270. The shaft 278 is driven from the electric motor 271 in the present instance by a relatively large belt pulley 279 fixed on the shaft 278, a relatively small belt pulley 280 which is fixed on the shaft of the electric motor and a belt 281 which passes over the pulleys 270 and 280. The ratios of transmission between the pulleys 279 and 280 and the gears 276 and 277 are such that the shaft 275 will be driven at a sufficiently reduced speed relatively to the speed of the motor shaft, the speed of the shaft 234 being thus determined so that the turn-table will rotate at a speed which will afford the various mechanisms of the machine to properly perform their operations. It will be understood that the electric motor may be started when the copying machine is put into use, and it may run continuously until the use of the copying machine is discontinued, the pedal 261, as previously described, serving, when operated at the will of the operator, to connect the motor or power driven gearing to the turn-table at the appropriate times.

The exposures of the photographic strip positioned by the mask on the turn-table are made through the lens 20 which has an image erecting prism 282 combined as a unit therewith, the lens and prism unit being mounted opposite to or in alinement with the opening 19 in the front wall of the casing. The lens and prism unit are preferably detachably mounted in a tube or socket 283 carried by the lens-board 284, the detachable mounting of this lens and prism unit enabling it to be removed and stored in a safe place when the machine is not in operation. The lens-board 284 has an aperture 285 therein through which light rays may pass from the lens and prism to the sensitized strip positioned by the mask, and the lens-board is attached to one end of a bellows 286, the opposite end of the bellows being attached to the front wall of the casing by a frame 287 which surrounds the exposure opening 19 therein, the bellows thus providing a light-tight enclosure between the lens and the casing of the machine to exclude all light except that admitted through the prism and lens. A cover plate 288 is applied to the front of the lens-board 284 and may be removably secured thereto by the screws 289 or other suitable means, this cover plate serving to carry the lens-receiving tube or socket 283. In order to support the bellows a lazy-tong structure 290 is preferably arranged at each side of the bellows and connected at its ends to the lens-board and the front wall of the casing, and cords 291 are extended from each lazy-tong structure, at intervals in its length, to the lower edge of the bellows, whereby the weight of the intermediate portion of the bellows will be sustained by these lazy-tong structures and sagging of the bellows under its weight will be thus avoided.

The lens-board and bellows are supported from an overhead support 293 which is fixed at one end to the front wall of the casing of the machine and projects forwardly therefrom. The lower edge of this support is provided with a track which extends parallel to the optical axis of the lens, the track being formed, for example, by in-turned portions 294 at the lower edges of the support and a slide 295 which is fitted to reciprocate longitudinally on the in-turned edges or flanges 294 provides a carriage for the lens-board 284. Means is preferably employed for adjusting the slide 295 longitudinally of its track, such means consisting, for example, of a shaft 296 which extends across and is rotatably mounted in the upper portion of the slide and carries pinions 297 adjacent to its ends which cooperate with racks 298, which latter extend longitudinally below the tracks formed by the flanges 294. By this arrangement, rotation of the shaft 296 will serve to adjust the slide 295 longitudinally along the track, and this adjustment is employed in focusing the optical system of the machine. One end of the shaft 296 may be provided with a knob 299 to facilitate its manipulation. Preferably, a pointer 300 is attached to the slide and arranged to cooperate with a scale 301 which is attached to the support 293, this scale being appropriately graduated to indicate, according to the position occupied by the pointer 300, the different adjustments of the slide 295. Means may be employed for locking the shaft 296 after it has been adjusted in order to prevent accidental or unintentional shifting of the slide 295. Such means may consist of a pair of clamping screws 302 which may be threaded through the upper portion of the slide 295 so that when tightened their ends will bear against the shaft 296 and thus prevent its rotation. These clamping screws, when used, would be loosened or disengaged from the shaft 296 prior to operation of this shaft to focus the lens system.

The lens-board 284 which is carried by the slide 295 is preferably adjustable vertically in the slide whereby the lens and prism unit may be shifted in a direction transversely of the optical axis of the lens, this adjustment being useful in making certain focusing adjustments, as will be understood by those familiar with this art. For this purpose, the lens-board is movable vertically between a pair of arms 303 which are parts of the slide 295 and extend downwardly at opposite sides of the lens-board. The latter may be guided between these arms by vertical ribs 304 on opposite sides of the lens-board and which are arranged to operate in vertical grooves 305 formed on the inner sides of the arms 303, rectilinear movement of the lens-board in a direction vertically of the slide being thus insured and displacement of the lens-board relatively to the slide, in a forward or rearward direction, being prevented. Adjusting means is provided for setting the lens-board in different vertical positions in the slide, such means consisting, in the present instance, of a rack bar 306 which is connected at its lower end to the upper end of the cover plate 288 which is attached to the lens-board 284, the upper end of the rack bar extending through and being suitably guided by the upper portion of the slide 295, and this rack bar is arranged to be engaged by a pinion 307 which is fixed on a shaft 308. The shaft 308 is rotatably mounted at its rear end in a bearing 309 which forms part of the slide 295, and it extends rotatably through a plate 310 which, as shown, is attached to the front of the slide. The pinion shaft 308 is provided with a knob 311 by means of which it may be rotated to effect different vertical adjustments of the lens-board with respect to the slide. Means is preferably provided for holding the pinion in different positions into which it may be adjusted, against the weight of the lens-board and the parts supported thereby. For example, the rear face of the adjusting knob 311 may be provided with ratchet teeth 312 to cooperate with similar ratchet teeth 313 formed on the forward side of the plate 310, these ratchet teeth being so arranged that they will permit rotation of the knob 311 in a direction to elevate the lens-board, but they will lock and thus prevent reverse rotation of the knob 311 which would allow the lens-board to descend. The pinion shaft 308 is capable of axial movement in its bearings to permit the knob 311 to be drawn forwardly when it is desired to lower the lens-board, this forward movement of the pinion shaft acting to disengage the ratchet teeth between the knob and the plate 310, and a compression spring 314 is arranged to bear against the pinion 307 and to thereby yieldingly force the pinion shaft rearwardly so that the ratchet teeth will be normally held in locking relation. Elevating of the lens-board may be effected by rotating the knob 311 in the proper direction without the necessity of drawing this knob forwardly, as the spring 314 will permit the ratchet teeth to ride idly past one another; and lowering of the lens-board may be effected by first drawing the knob 311 forward, thus disengaging the ratchet teeth and then rotating the knob 311 in the appropriate direction to lower the lens-board, and when the lens-board has been lowered to the desired point the knob 311 is permitted to move rearwardly under the action of the spring 314, whereupon the ratchet teeth will be reengaged and they will serve to lock the lens-board against further descent. Means is preferably provided for indicating the different positions occupied by the lens-board with respect to the slide 295, thus facilitating the adjustments of the lens-board. As shown, a pointer 315 is provided for this purpose, which is attached to the cover plate 288 carried by the lens-board, and a scale 316 is attached to one of the arms 303 of the slide, so that the pointer 315 will cooperate therewith. The scale is appropriately graduated to indicate the different adjustments of the lens-board with respect to the slide.

By supporting the lens-board and bellows from an overhead support, substantially as hereinbefore described, the support for these elements is placed in such a position that it will not obstruct the view of the copy which, as will hereinafter appear, is located below the lens system and bellows, and, furthermore, the overhead support will not obstruct or interefere to any extent with the light rays passing from the copy to the lens system, and these advantages are secured notwithstanding that the support may, and preferably does, extend beyond the usual position occupied by the lens in order to afford a wide range of focusing adjustment for the optical system of the machine.

The exposures of the photographic strip are controlled by a suitable shutter. The present invention provides a relatively simple and efficient shutter which is particularly suitable for machines of this general class. This shutter, as shown in Figures 34 and 35, comprises a pair of rollers 317 and 318 which are mounted on shafts 319 and 320 which are located at opposite sides of the exposure aperture 285. The ends of these shafts may be mounted in flanges 321 formed on the opposite sides of a bracket 322, the latter being provided with a central exposing aperture 323 which registers with the exposure aperture 285 of the lens-board, and this bracket is perferably secured against the rear side of the lens-board by the screws 324 or other suitable means. Idler rollers 325 and 326 are mounted at their ends in the side flanges 321 of this bracket, these idler rollers being located adjacent to the rollers 317 and 318, respectively. The shutter is of the curtain type, it comprising a curtain 327 which is composed of oiled or rubberized fabric or other opaque flexible material and is apertured at 328, the opposed edges of the apertures having strips 329 and 330 attached thereto which define the exposure aperture through the curtain when said strips are relatively separated by movement of the curtain to effect an exposure. The curtain 327 is formed with bands 331 which extend from the strip 329 at opposite sides of the exposure aperture 323, and are fixed to the roller 318 as by the tacks or fastenings 332. The curtain is doubled over or around the roller 317 and extends to the roller 318 and this end of the curtain is fastened to the roller 318 by tacks 333 or other suitable means. The forward side of the curtain is provided at opposite sides of the exposure aperture 328 in this portion of the curtain with bands 334 which connect the unapertured portions of the curtain. The forward side of the curtain passes at the rear side of the idler rollers 325 and 326, these idler rollers being so located that the forward and rear portions of the curtain will be caused to operate in substantially the same plane, and hence the strips 329 and 330 on these portions of the curtain, when the latter is closed, will lie sufficiently close to one another to prevent passage of light between them. In Figure 34, the curtain is shown in its closed position and it is preferable to employ means which acts normally or constantly to move the curtain into this position and to retain it in such position. As shown, a coiled tension spring 335 is employed for this purpose, one end of this spring being fixed to a part of the bracket 322 as by the pin 336 and the other end of the spring is attached by an eye 337 or other suitable means to the roller 318, the end of this roller in circumferential alinement with the eye 337 being preferably formed with a peripherally-continuous groove 338 in which the spring 335 may wind when the roller 318 is rotated in a direction to open the curtain, the roller 318 being shown in this position and the curtain in open position in Figure 35, the strips 329 and 330 on the inner ends of the curtains being separated at this time so that the exposure aperture 323 is uncovered. The spring 335, however, acts to rotate the roller 318 in a direction to close the curtain, as shown in Fig. 34. A peripherally-notched flange 320ª is fixed to an end of the roller 318 and arranged to cooperate with a stop 320ᵇ on the shutter casing to properly limit the rotation of said roller in reverse directions and thus stop the movement of the curtain when it reaches fully open position and to arrest the closing movement of the curtain when it reaches fully closed position under the influence of the spring 335.

Suitable means is provided for actuating the shutter to effect the desired exposures. In the construction shown for this purpose in the present instance, the shaft 320 of the roller 318 is connected by a coupling 339 to a shaft 340, which latter is journaled in a suitable bearing 341 formed on or attached to the lens-board 284, and the outer end of this shaft has a grooved pulley 342 fixed thereon. A cord 343 is attached to and passes around the pulley 342, this cord being capable of extending to a point within convenient reach of the operator occupying his usual position at the front of the machine. The spring 335 of the shutter normally holds the latter in its closed or non-exposing position as determined by the flange 320ª and cooperating stop 320ᵇ, the cord 343 at this time being slack. To make an exposure, the operator pulls the cord 343, thereby rotating the pulley 342 and, in consequence, the roller 318, in a direction to open the shutter, as is shown in Figure 35, the shutter opening operation taking place in opposition to the tension of the spring 335. The cord 343 is held under tension and the shutter is thereby held in open position until an exposure of the desired duration has been completed, and the exposure is terminated by simply releasing the cord 343, the spring 335 being then permitted to act immediately to close the shutter. In order to facilitate the timing of the duration of the exposures, a clock 344, which may be of any suitable kind, but is preferably one provided with a second hand, is mounted on a bracket 345 fixed at the front of the machine in a position where it may be conveniently observed by the operator.

A color filter, such as that shown in Fig. 36, is preferably provided for use in those instances where the matter to be copied bears a color or colors other than black and white. This color filter, designated 346, is carried in a suitable frame 347 which is fixed to a shaft 348 which extends forwardly through the cover plate 288 at one side of the lens-receiving tube or socket therein, the forward end of the shaft being provided with a handle 349, a rotation of which will serve to swing the color filter from its normal inoperative position, as shown by the full lines, into the operative position shown by the dotted lines in Figure 36, or vice versa. The limits of movement of the filter are preferably determined by a pair of stops 350 and 351 which are formed on the rear side of the cover plate 288 and between which operate a tooth or projection 352 which is formed on or attached to the filter frame 347. Means is provided for yieldingly retaining the filter in either its operative or its inoperative position, such means comprising preferably a spring 353 which is fixed at one end to the rear side of the cover plate 288, as by the screw 354, and the opposite end of this spring is bent laterally and extended through a perforation 355 formed in the filter frame 347 at a point adjacent to the shaft 348. The perforation 355 is so located that it will occupy positions at opposite sides of a line drawn between the center of the shaft 348 and the screw 354 when the filter frame occupies its operative and inoperative positions, respectively, as will be observed from Figure 36, and as the perforation 355 passes such line incident to the swing of the filter toward either operative or inoperative position, the spring 353 will be bowed or compressed longitudinally and it will, therefore, act to yieldingly retain the filter in either operative or inoperative position. The position occupied by the handle 349 will indicate to the operator whether the filter is in operative or inoperative position.

The copy to be reproduced is placed on a copyboard which is located at the front of the machine and in a position beneath the prism 282. The copyboard and its supporting and adjusting means comprise preferably a pair of upright guide rails 356 which are secured at their upper and lower ends to the front wall of the casing of the machine by suitable brackets 357 and 358, and these rails serve to support and guide a slide 359 which is grooved at its opposite sides, as at 360, to receive these rails. The slide 359 is provided with means for adjusting it vertically on the rails, it having a nut 361 in which engages a vertical screw 362, the upper and lower ends of this screw being suitably journaled in the brackets 357 and 358, and the upper end of the screw has a bevel gear 363 fixed thereon and arranged to cooperate with a similar gear 364 which is fixed on a shaft 365, the latter being journaled in the upper bracket 357 and extending rearwardly therethrough and having a bearing at its rear end in a bracket 366 which is secured within the casing of the machine and against the inner side of the forward wall thereof. The shaft 365 is provided with a second bevel gear 367 which engages with a similar gear 368 formed on a horizontal shaft 369, the latter extending to the exterior of the casing and having an operating crank 370 fixed thereon. Rotation of the crank 370 operates through the gearing described to rotate the screw 362, and the rotation of this screw, which engages in the nut 361 or slide 354 serves to adjust the elevation of the copyboard.

A pair of arms 371 project forwardly from the slide 359 and have rails 372 fixed on their upper sides. These arms are preferably provided with means for adjusting them to bring the upper edges of the rails 372 into the same plane and for adjusting these rails to bring them into the proper plane with respect to the axis of the optical system. For this purpose, the rear or supporting ends of the arms 371 are pivotally attached to the slide 359 at 373 and a set screw 374 at the lower portion of each arm serves to adjust it about its pivot.

The copyboard 375 (Fig. 29) is mounted on a pair of slides 376 which are fixed to its under side, and these slides are grooved or otherwise formed to fit on and to reciprocate longitudinally on the rails 372. Means is provided for adjusting the copyboard into different positions longitudinally on the rails 373. As shown, the rails 372 have rack bars 377 fixed at their inner sides and a shaft 378 extends through and is journaled to rotate in the slides 376 on the copyboard, this shaft having pinions 379 fixed thereon and arranged to mesh with the rack bars 377. Rotation of the shaft 378 and, in consequence, rotation of the pinions 379 which are in engagement with the relatively fixed racks 377 will cause the copyboard to be shifted longitudinally of the rails 372. Means is provided for rotating the shaft 378 and for locking it in different set positions. As shown, a hand-wheel 380 is splined on the outer portion of the shaft 378, this hand-wheel providing means for rotating the shaft. A sleeve 381 is mounted loosely on the shaft 378 between the hub of the hand-wheel 380 and the outer side of the adjacent slide 376, and the inner end of this sleeve is bevelled and the portion of the slide 378 which is engaged by the sleeve is correspondingly beveled, as is indicated at 382, to provide a friction lock between the sleeve and the non-rotatable slide 376. The outer end of the shaft 388 is provided with a clamping nut 383, which is arranged to bear against the outer side of the hub of the hand-wheel 380. When the nut 383 is loosened, the friction lock produced between the sleeve 381 and the slide 376 is released, and the hand-wheel may then be rotated to operate the shaft 378, and when the latter has been adjusted, as desired, the nut 383 is tightened, the hub of the hand-wheel being then forced against the sleeve 381 and the sleeve in turn being forced against the slide 376 to produce a binding or friction lock between the bevelled or conical surfaces 382.

The document, book or other copy to be photographed is supported on a plate 384, this plate having springs 385 attached to its under side and which rest on the copyboard 375. A frame 386 containing a glass panel 387 is arranged to bear on the copy placed on the plate 384, this frame being preferably hinged at 388 to the rear edge of the copyboard 375, and the frame 386 is preferably provided with arms 389 which project beyond and below its rear edge and have springs 390 attached thereto, the opposite end of each of these springs being attached to the respective slide 376, as at 391. The springs 390 which are under tension act normally with sufficient force to overbalance the weight of the frame 386 and the glass panel 387 therein, so that the springs will be able to swing this frame and glass panel upwardly out of contact with the copy on the plate 384 and to support the frame and glass panel in this position. A latch 392 is provided on the forward edge of the copyboard 375, this latch having a hook arranged to engage a catch 393 on the forward edge of the frame 386. After the copy to be photographed has been placed on the plate 384, the frame 386 is swung downwardly and its fastening 393 engaged with the latch 392, the glass panel 387 bearing on the copy and thus causing it to lie flat and in a given plane so that all portions of the copy will be in the same focal relation with the photographic strip positioned in the mask. The springs 385 will yield more or less under the compression exerted on the copy by the frame 386, thus accommodating the copyboard to books, documents or other matter which varies considerably in thickness. When a book is placed on the plate 384, the springs 385 will produce an equalizing action which will compensate for differences in the thickness of the pages of the book at opposite sides of its center or binding. After the open or exposed pages of the book have been photographed, and it is desired to bring other pages of the book into position for exposure or after matter has been photographed and it is desired to remove such matter and to substitute other matter to be photographed, the latch 392 is actuated to release the frame 386, and when this has been done, the springs 390 will act automatically to lift the glass panel 387 to a position above the copy and the latter is then relieved and may be removed and other matter placed on the plate 384 quickly and with facility. The adjustment of the slides 376 along the rails 372 enables the copyboard to be properly centered with respect to the optical center of the machine or to set the copyboard in any other desired relation to the optical center of the machine and to facilitate this adjustment, one of the slides 376 may carry a pointer 394 which is arranged to travel longitudinally along a scale 395, which is secured to the side of one of the arms 371, the scale being appropriately graduated so that the position occupied by the pointer 394 will indicate the position occupied by the copyboard. It will be understood that the copyboard may be any one of several different types, depending upon the class of work to be photographed, the copyboard herein illustrated and described being characteristic of one type of copyboard which is suitable for use in a machine of this class.

The copy or matter to be photographed, while positioned by the copyholder, is illuminated by a pair of reflectors 396 which are located at a level above the copyboard and at opposite sides of the optical field of the lens 20 and prism 282. Each of these reflectors is adjustable angularly and longitudinally in a horizontal plane on a bracket 397, and each of these brackets is carried on the upper end of a post or standard 398. Each of these standards is adjustable vertically in a socket 399 which is formed on a bracket 400 which is bolted or otherwise secured to the side of the respective slide 376, and clamping screws 401 are provided for locking the posts or standards 398 at the desired elevation in the sockets 399. The reflectors 396 are adapted to contain appropriate illuminating means, mercury vapor lamps being generally employed for such purposes, the reflectors serving to distribute the light from these lamps uniformly over the surface of the copy positioned by the copyboard. The conductors 402 which supply current to the lamps may extend downwardly through the posts or uprights 403, which may be made tubular or hollow for this purpose, to auxiliary apparatus, such as is generally used in conjunction with such lamps. The reflectors and lamps positioned as described at opposite sides of the copy avoid obstruction of the light rays between the copy and the prism, and they enable the copy to be inspected and handled by the operator without interference. A pointer 404 is preferably provided on the slide 359 to co-operate with a scale 405 which is mounted on the front wall of the casing of the machine, this scale being appropriately graduated to indicate the different vertical positions of the copyboard according to the position occupied by the pointer.

The scale 301 on the lens-board support and the scale 405 for the copyboard may be provided with graduations which conform with the settings of the lens and copyboard for certain sized reductions or enlargements, this facilitating the setting of the machine for the making of photographs of any desired sizes, and when the machine has been set for any given size photographs, any number of photographs of such size may be made without refocusing the machine.

The operation of the machine is, briefly, as follows: After the copy or matter to be photographed has been placed on the plate 384 and the frame 386 has been lowered and latched, the machine is focused and adjusted to produce prints or exposures of the desired size. The focusing of the machine may be effected either by placing a ground glass in the mask in place of the photographic strip so that the ground glass will receive light rays from the lens through one of the mask openings 34, or the light rays may be focused directly on a section of the photographic paper contained in the mask, the mask being rendered accessible for focusing purposes by opening of the door 16 which gives access to the upper compartment 8 of the machine. The shutter at this time will be open so that an image of the copy will be projected by the lens onto the ground glass or the photographic paper. The lens-board slide 395 is adjusted along the overhead support 293, the copy-board slide 359 is adjusted vertically on the rails 356 and the copy-board is adjusted along the rails 372 so that a complete image of the desired size will be projected by the lens onto the ground glass or the photographic paper positioned in the mask. The image may be sharpened by raising or lowering the copy-board which is accomplished by rotation of the handle 370 or by rotating the knob 299 which shifts the lens-board along the overhead support 293 and the image of the copy is properly centered in the mask opening 34 by rotating the hand wheel 380 which shifts the copy beneath the prism 282 in a direction transverse to the optical axis of the machine. The scale 395 for the copyboard 394 is preferably provided with graduations which correspond with the graduations of the scales 301 and 405, so that the copyboard may be readily positioned beneath the prism to correspond with the different focusing positions of the lens and the copyboard. The designations on the scales 301 and 405 also may correspond with one another so that the lens and the copyboard may be readily set in the different focusing positions to conform with the enlargement or reduction of the reproduction as compared with the original copy.

It will be understood that when the machine is in position for operation, the rear wall of the machine is placed against a dark room having print-developing and fixing facilities, and such other apparatus as may be necessary for the proper treatment of photographic prints, and the opening 10 in the rear wall of the casing of the machine will be accessible from the interior of the dark room. The operator of the machine may be seated on a chair placed in front of the copyboard, from which point the various control devices are within reach for manipulation.

After the machine has been properly focused and the operator has noted whether the matter to be copied appears in black and white as in ordinary printed matter, or whether the matter to be copied contains other colors, which will determine whether or not the color filter 346 is to be used, the diaphragm of the lens is set for the proper exposure opening and the copy illuminating lamps are lighted. Assuming that a strip of photographic paper has been threaded through the mask and between the feed rolls, the machine is ready for operation. The exposure of the photographic strip is accomplished by pulling the cord 343 which opens the shutter, and after an exposure of appropriate duration has been completed, the cord is released, allowing the shutter to close, and the operator then depresses the pedal 261. Depression of this pedal retracts the bolt 96, thereby releasing the turn-table and at the same time the clutch member 246 is moved into engagement with the clutch member 232, thereby establishing driving connection between the turn-table and the continuously driven shaft 234, the electric motor 271 being assumed to be in operation. If photographic paper sensitized on both sides is employed, and the opposite sides of such paper are to be exposed consecutively, the switch 99 occupies the full line position shown in Figure 31. In consequence, the turn-table, after being released and rotated by the power mechanism hereinbefore described, will rotate until the notch 95 in the indexing ring reaches the bolt 96, whereupon the turn-table will be arrested in its rotation and locked by the bolt 96 and the power drive for the turn-table will be disconnected therefrom. This half revolution of the turn-table serves to turn the photographic paper in the mask through an angle of 180°, so that the rear surface of the paper is presented to the lens for exposure. While the paper reversing operation is taking place automatically following manipulation of the pedal 261, the operator will be free to adjust the copy to turn it over or to otherwise prepare it for the next exposure, and this second exposure which is made after the paper has been reversed, is effected by again pulling cord 343 which opens the shutter as before described.

While the turn-table is in its initial position, the target 196 will be in its forward position, and this target which can be seen by the operator occupying a position in front of the machine will inform him that the front half of the photographic strip is in position for exposure. After the turn-table has completed a half revolution or has rotated through an angle of 180° from its initial position, the other target 197 will be in its forward or indicating position, and this will inform the operator that the back half of the photographic strip is in position for exposure.

The first half of the revolution of the turn-table merely reverses the photographic paper so as to bring its rear side in position for exposure through the lens, but after the exposure of the rear surface of the photographic paper has been completed, depression of the pedal 261 which serves to withdraw the bolt 96 from the notch 95 and thus unlock the turn-table and which also establishes a driving connection between the turn-table and the continuously revolving shaft 234, initiates the second half of the revolution of the turn-table by which the latter is returned to its initial position, and when the turn-table has completed a full revolution and has returned to its initial position, the target 196 will be shifted to its forward or indicating position and this will inform the operator that the full revolution of the turn-table has been completed. During the second half of the revolution of the turn-table, the feed rolls are operated automatically to an extent sufficient to feed a proper length of the photographic strip to bring the exposed section thereof into position for delivery, the length of the photographic strip thus advanced being determined by the setting of the cam member 132 which regulates the length of the depressed portion 130 of the cam, and following the strip feeding operation, and immediately prior to the completion of the full revolution of the turn-table, the knife operates to sever the exposed section of the strip from the remainder thereof, this being effected automatically by the passage of the roller 180 over the cam 184. The exposed and severed section of the photographic strip drops through the sleeve 13 into the lower compartment 9 of the casing and it may be readily removed therefrom through the opening 10 into the dark room for developing, fixing and other operations as may be necessary for the production of the finished print.

The feeding of the photographic strip to bring the exposed section thereof into a delivery position also brings a fresh or unexposed section of the strip into the mask for subsequent exposures, and these exposures are made in the same way as has been described.

If it is desired to make exposures upon photographic paper sensitized on one side only, such paper may be threaded into the machine while the turn-table occupies its initial position, but the switch 99 is set in the dotted line position shown in Figure 31. The exposure of the sensitized surfaces of such paper may be made by opening the shutter, as before, after which the pedal 261 is depressed, but in this case, the turn-table will make a complete revolution before stopping as the notch 95 in the indexing ring will be closed by the switch, and, hence, the bolt 96 will not be received therein. However, the advancing of the photographic strip to bring the exposed section thereof into position for delivery and the severing of the exposed section from the remainder of the strip will take place automatically during the second half of the revolution of the turn-table. When the turn-table has completed a full revolution, the fresh portion of the photographic strip which was fed into the mask incident to the advance of the exposed section to a position for delivery will present its front or sensitized surface to the lens for exposure, and the exposure thereof may be effected by repeating the operations already described.

The indicators or targets 196 and 197 will inform the operator when the machine is in condition for an exposure, and when the target 196 is in its forward or indicating position, it will inform the operator that the exposed section of the photographic strip has been advanced and severed and a fresh or unexposed portion of the strip is in position for exposure. The indicating device comprising the toothed disk 67 and cooperative vibratory spring 68 will operate at each paper feeding operation to inform the operator that a section of paper has been actually fed from the supply spool, and in the absence of an indication by this device, the operator will be informed that the supply of paper on the spool has become exhausted, or that the paper feeding operation has not taken place, so that the supply of paper can be replenished or the machine otherwise restored to proper working position without loss of time. The paper measuring device which is capable of being easily and quickly set by manipulation of the handle 145 located at the front of the machine enables the operator to easily and quickly set the feeding means to advance an appropriate length of the paper strip at each feeding operation, and the indicator 146 and cooperating scale 151 informs the operator as to the setting of the paper measuring device at any given time and also faciltates any desired change in the setting of the paper measuring mechanism.

I claim:—

1. In a photographic copying machine, the combination with a camera body of a rotatable member carrying means within said body for holding a sheet of photographic material and operative to present one or the other of the sides of the sheet in position for exposure, an indexing device within said camera body connected to rotate with said member, and a stopping device cooperative with the indexing device to set and hold said member in one or the other of its operative positions.

2. In a photographic copying machine, the combination with driving mechanism of a turntable carrying means for holding a photographic sheet sensitized on both sides in position for exposing each side thereof successively, mechanism operable at will for connecting said driving mechanism to said turntable to initiate movement thereof, means operative automatically to set and hold the turntable after each half revolution and each complete revolution thereof from a given position, and means for rendering the setting and holding means inactive to permit said driving mechanism to move said turntable.

3. In a photographic copying machine, the combination with driving mechanism of a turntable carrying means for holding a photographic sheet sensitized on both sides in position for exposing each side thereof successively, mechanism operable at will for connecting said driving mechanism to said turntable to initiate movement thereof, an indexing ring rotatable with the turntable and having notches spaced to conform with the positions of the turntable when rotated a half revolution, respectively, and a full revolution from a given position, a setting and locking dog arranged to cooperate with said notches, and means to render one of the notches inactive with respect to the dog.

4. In a photographic copying machine, the combination with driving mechanism of a turntable carrying means for holding a photographic sheet sensitized on both sides for exposure of each side thereof successively, an indexing ring concentric with and carried by the turntable and having setting notches located at diametrically opposite points in the circumference, a device to engage in said notches successively and thus set the opposite sides of a photographic sheet carried by the turntable successively in exposing position, means for connecting said driving mechanism to said turntable to tend to rotate the latter until said device engages one of said notches, and a switch for rendering one of said notches inactive with respect to said device.

5. In a photographic copying machine, the combination of a rotatable member carrying means for holding a sheet of photographic material in exposing position, continuously moving driving means for rotating said member to reverse the position of the sheet, a transmission mechanism, and controlling means connected with the latter operable at the will of the operator for connecting said driving means to said member.

6. In a photographic copying machine, the combination of a member carrying means for holding a sheet of photographic material in exposing position, said member being rotatable to reverse the position of the sheet, driving means for rotating said member, and controlling means for connecting the driving means to said member and for automatically disconnecting the driving means therefrom when said member reaches a predetermined position in its rotation.

7. In a photographic copying machine, the combination of a member having means for holding a sheet of photographic material in exposing position, said member being rotatable to reverse the position of the sheet, power driven means for rotating said member, and controlling means operable at the will of the operator to connect the driving means to said member to rotate it and embodying means for automatically disconnecting it from said member when the latter reaches a predetermined position.

8. In a photographic copying machine, the combination of a member having means to hold a sheet of photographic material in exposing position and rotatable to alter the position of the sheet, means operative to hold said member to position the sheet for exposure, driving means for rotating said member, and a controlling connection between said holding means and driving means whereby the driving means will be connected to drive said member when the holding member is released therefrom.

9. In a photographic copying machine, the combination of a rotatable member for holding a sheet of photographic material in exposing position and for moving it out of such position, means for holding said member in a predetermined position, driving means for rotating said member, and an interconnection between the holding means and driving means whereby the driving means will be operative to rotate said member when the holding means is in condition to release it.

10. In a photographic copying machine, the combination of a rotatable member for holding a sheet of photographic material sensitized on both sides in position to expose either side thereof and for removing it from such position, means for holding said member in a predetermined position, continuously moving driving means for rotating said member, and means for rendering the driving means inoperative with respect to said member and concomitantly operating the holding means.

11. In a photographic copying machine, the combination of a rotatable member for supporting a sheet of photographic material in exposing position and for removing it from such position, means for holding said member in position for exposure of the sheet, driving means for rotating said member to remove the sheet from exposing position, and an interconnection between said holding means and driving means whereby the driving means will be rendered operative to rotate said member when the holding means is released, and the driving means will be rendered inactive when the holding means is operative.

12. In a photographic copying machine, the combination of a rotatable member for supporting a sheet of photographic material in exposing position and for removing it from such position, means normally tending to act and operative to hold said member in position for exposure of the sheet, driving means for rotating said member to remove the sheet from exposing position, and an interconnection between said holding means and driving means whereby the driving means will be rendered operative to rotate said member when the holding means is released therefrom and the driving means will be rendered inoperative when the holding means acts to hold said member.

13. In a photographic copying machine, the combination of a turntable for supporting a sheet of photographic material in exposing position and for removing it from such position, an indexing ring rotatable with the turntable and having a positioning notch therein, a stopping device normally forced toward the indexing ring and adapted to engage in the positioning notch therein, driving means for rotating the turntable, and a connection between the stopping device and driving means whereby the driving means is inoperative while the stopping device engages in the notch of the indexing ring and is rendered operative when the stopping device is disengaged from the notch and held in operative condition by the engagement of the stopping device on the unnotched portion of the indexing ring.

14. In a photographic copying machine, the combination of a turntable for holding a sheet of photographic material in position for exposure and for removing the sheet from such position, a device for setting and holding the turntable in position for exposure of the sheet, power-driven means for rotating the turntable, a clutch controlling the driving connection between said means and the turntable, and means operatively connecting said setting and holding device and said clutch to engage the clutch when said device is released from the turntable and for disengaging the clutch when said device is operatively engaged with the turntable.

15. In a photographic copying machine, the combination of a turntable for holding a sheet of photographic material in position for exposure and for removing the sheet from such position, a setting and locking device cooperative with the turntable, driving means for rotating the turntable, a clutch controlling the operation of the driving means, a connection between the setting and locking device and the clutch whereby the clutch will be engaged when said device is actuated to release the turntable, and means normally tending to actuate said device to lock the turntable and to disengage the clutch.

16. In a photographic copying machine, the combination of a turntable having means for holding a sheet of photographic material sensitized on both sides in position for exposing either side thereof and rotatable to remove the sheet from such position, means normally acting to lock the turntable in a position for exposure of the sheet, power-driven means adapted to be connected to the turntable to rotate it, and controlling means operative at the will of the operator both to release the locking device from the turntable and to connect the power-driven means thereto.

17. In a photographic copying machine, the combination of a turntable having means for holding a sheet of photographic material in exposing position and rotatable to carry the sheet out of such position, feeding means for advancing the sheet, and means operative during the rotation of the turntable for actuating the feeding means.

18. In a photographic copying machine, the combination of a rotatable member carrying means for positioning a sheet of photographic material and operative to reverse it, feeding means carried by said member and operative to advance the sheet, and means operative in consequence of rotation of said member to actuate the feeding means.

19. In a photographic copying machine, the combination of a member having means for positioning a sheet of photographic material for exposure and operative to reverse the sheet, feeding means for advancing the sheet, and means operative during the reversing operation of said member to actuate the feeding means.

20. In a photographic copying machine, the combination of a member having means for positioning a sheet of photographic material for exposure and operative to reverse the sheet, feeding means for advancing the sheet, and means operative by the reversing movement of said member for actuating the feeding means.

21. In a photographic copying machine, the combination of a supporting base, a turntable rotatably mounted thereon and having means for holding a sheet of photographic material for exposure, feeding means for advancing the sheet, and means interposed between the turntable and base and operative in consequence of relative rotation of the turntable to actuate the feeding means.

22. In a photographic copying machine, the combination of a rotatable member for positioning a sheet of photographic material, feeding means for advancing the sheet, means operative during rotation of said member for actuating the feeding means, and means for varying the extent to which the feeding means is actuated.

23. In a photographic copying machine, the combination of a rotatable member having means for positioning a sheet of photographic material, feeding means operative to advance the sheet, during the rotation of said member, and means for varying the angle in the rotation of said member through which the feeding means operates.

24. In a photographic copying machine, the combination of a turntable having means for positioning a sheet of photographic material, feeding means operative to advance the sheet in consequence of rotation of the turntable, and means for lengthening or shortening the arc in the rotation of the turntable during which the feeding means operates.

25. In a photographic copying machine, the combination of a base, a turntable rotatable thereon and carrying means for positioning a sheet of photographic material, feeding means operative to advance the sheet, in consequence of rotation of the turntable, and means including a cam member adjustable circumferentially of the base for varying the extent to which the feeding means operates.

26. In a photographic copying machine, the combination of a turntable having means for positioning a sheet of photographic material, feeding means for advancing the sheet during rotation of the turntable, and means for rendering the feeding means operative during a portion of the rotation of the turntable and for rendering it inoperative during another portion of such rotation.

27. In a photographic copying machine, the combination of a rotatable member having means for positioning a sheet of photographic material, feeding means operative during rotation of said member for advancing the sheet, and means having a part operative during one portion of the rotation of said member to render the feeding means inactive and having another part operative during another portion of the rotation of said member to render the feeding means active, and embodying means for varying the length of one of said parts.

28. In a photographic copying machine, the combination of a rotatable member having means for positioning a sheet of photographic material, feeding means for advancing the sheet, means for driving the feeding means during rotation of said member, and means controlling the feeding operation embodying a cam and means cooperative with the cam, during rotation of said member, to render the feeding means inactive with respect to the sheet during part of the rotation of said member and to render the feeding means active with respect to the sheet during another part of said rotation.

29. In a photographic copying machine, the combination of a rotatable member having means for holding a sheet of photographic material, feed rolls for advancing the sheet, said rolls being relatively movable to render them active or inactive with respect to the sheet, means for driving the feed rolls during rotation of said member, and means for relatively positioning the feed rolls to render them inactive with respect to the sheet during part of the rotation of said member and for relatively positioning the feed rolls to render them active with respect to the sheet during another part of such rotation.

30. In a photographic copying machine, the combination of a base having an annular portion, a turntable rotatable on the base and having means for positioning a sheet of photographic material, feeding means for advancing the sheet during rotation of the turntable, and means for controlling the operation of the feeding means embodying a controlling arm, and a cam on the annular portion of the base on which said arm rides, said cam having a portion thereof adjustable in a direction circumferentially of said annular portion to vary the period in the rotation of the turntable during which the feeding means is active.

31. In a photographic copying machine, the combination of a rotatable member having means for positioning a sheet of photographic material, feeding means for advancing the sheet during rotation of said member, means for controlling the length of the sheet advanced at each operation of the feeding means, and setting means for the controlling means.

32. In a photographic copying machine, the combination of a turntable carrying means for feeding a sheet of photographic material thereon, means for controlling the length of the sheet advanced by the feeding means at each operation thereof, means for setting the controlling means to cause the feeding of different lengths of the sheet, a common driving means for rotating the turntable and the feeding means, and means for indicating the different settings.

33. In a photographic copying machine, the combination of a rotatable member having means for positioning a sheet of photographic material, driving means therefor, and a knife connected to the driving means operative to sever the sheet in timed relation to the rotation of said member.

34. In a photographic copying machine, the combination of a rotatable member for supporting a sheet of photographic material, a knife carried by said member and operative to sever the sheet, and means operative automatically when said member reaches a predetermined point in its rotation to cause sheet-severing operation of the knife.

35. In a photographic copying machine, the combination of a rotatable sheet-supporting member, a knife operative to sever the sheet, means normally acting to open the knife to provide a passageway for the sheet, and means operative automatically during rotation of said member to operate the knife to sever the sheet.

36. In a photographic copying machine, the combination of a rotatable sheet-supporting member, a knife operative to sever the strip, means normally acting to yieldingly hold the knife in retracted position, and means including a cam operative to actuate the knife to sever the sheet when said member reaches a predetermined point in its rotation.

37. In a photographic copying machine, the combination of a rotatable member having means for positioning a sheet of photographic material, a knife carried by said member and operative to sever the sheet, means acting to yieldingly hold the knife in retracted position, a cam, and an actuating device carried by said member and movable, during the rotation thereof past said cam, to actuate the knife to sever the sheet and subsequently permit retraction of the knife.

38. In a photographic copying machine, the combination of a base, a turntable rotatable thereon and having means for positioning a sheet of photographic material, a knife carried by the turntable and operative to sever the sheet, means normally acting to yieldingly retract the knife, an actuating member for the knife carried by the turntable, and a cam fixed to the base in the path of said actuating member and operative during rotation of the turntable to actuate the knife to sever the sheet and to subsequently release the knife to permit its retraction.

39. In a photographic copying machine, a sheet severing knife comprising a reciprocatory blade-carrying member, means normally acting to retract said member, and buffers arranged to act yieldingly against said member when in its retracted position.

40. In a photographic copying machine, a sheet severing knife comprising a reciprocatory blade carrying member, spring means acting to retract said member, and buffers acting to yieldingly arrest the retracting movement of said member.

41. In a photographic copying machine, a sheet severing knife comprising a reciprocatory blade carrying member, means acting to retract it, buffers having means for pressing them yieldingly toward the said member when the latter is retracted, and stop means for positioning the buffers whereby the latter will gauge the position of said member when retracted.

42. In a photographic copying machine, a sheet severing knife comprising cooperative knife bars one of which carries a blade and is movable, and the other bar having a slot to receive the blade, one edge of the slot being offset beyond the other edge thereof to prevent catching of the severed edge of the sheet when fed past the slot.

43. In a photographic copying machine, a sheet severing knife comprising cooperative knife bars, one of said bars being reciprocatory in a direction toward and from the other bar and carrying a severing blade, and the other bar having a slot to receive the blade, one of the edges of the slot having a lip projecting therefrom in a direction toward the reciprocatory bar and being operative to prevent catching of the severed edge of the sheet on the other edge of the slot when the sheet is fed past the slot.

44. In a photographic copying machine, the combination of a turntable having means for holding a sheet of photographic material in position for exposure and rotatable to reverse the sheet and thus present its opposite sides consecutively in position for exposure, feeding means operative through the rotation of the turntable during the second half of the revolution of the sheet to advance the exposed portion thereof for delivery, and means also operative through the rotation of the turntable during the second half of the revolution of the sheet to sever the exposed portion thereof.

45. In a photographic copying machine, the combination of a turntable rotatable to successively present the opposite sides of a sheet of photographic material for exposure, feeding means for advancing the sheet, a knife for severing the sheet, means operative automatically in consequence of rotation of the turntable to actuate the feeding means and means operative subsequently and automatically in consequence of rotation of the turntable to actuate said knife.

46. In a photographic copying machine, the combination of a turntable having means for positioning a sheet of photographic material and rotatable to present the opposite sides of such sheet consecutively for exposure, means for arresting the rotation of the turntable when it has rotated through a half revolution, feeding means operative to advance the sheet during the second half of the revolution of the turntable, and a knife also operative during the second half of the revolution of the turntable to sever the sheet.

47. In a photographic copying machine, the combination of a turntable having means for holding a sheet of photographic material and rotatable to present the opposite sides of the sheet consecutively in exposing position, driving means for rotating the turntable, means for setting the turntable at each half revolution thereof, to position the opposite sides of the sheet for exposure, feeding means operative automatically, during the second half of the revolution of the turntable, to advance the sheet, and means also operative automatically during the second half of the revolution of the turntable, to sever the sheet.

48. In a photographic copying machine, the combination of a turntable having means for holding a sheet of photographic material and rotatable to present the opposite sides of the sheet consecutively in exposing position, driving means for rotating the turntable, setting means for arresting and holding the turntable after each half revolution thereof, means operative to release the setting means and render the driving means operative to rotate the turntable, feeding means for advancing the sheet, a knife for severing the sheet, means operative during the second half of the revolution of the turntable to actuate the feeding means, and means also operative during the second half of the revolution of the turntable to actuate the knife.

49. In a photographic copying machine, the combination with a camera body of a member having means wholly within said body for holding a supply of sensitized sheet material, said member being rotatable to present the opposite sides of a portion of the sheet material consecutively for exposure, and means arranged exteriorly of the camera body for indicating the different positions occupied by said member.

50. In a photographic copying machine, the combination of a member having means for holding a sheet of photographic material and rotatable to present the opposite sides of the sheet consecutively for exposure, means for arresting and holding said member at the end of each half revolution thereof, a pair of indicators for indicating the positions of said member at the ends of its half and complete revolutions respectively, and means operative by said member during its half and complete revolutions for selectively setting said indicators.

51. In a photographic copying machine, the combination of a turntable having means for holding a sheet of photographic material and rotatable to present the opposite sides of the sheet consecutively in exposing position, means for setting and holding said member at the end of each half revolution thereof, a pair of reciprocatory indicators, and actuating devices located in relatively different positions on the turntable and cooperative selectively with said indicators to set them according to the position occupied by the turntable.

52. In a photographic copying machine, the combination of a rotatable turntable, means for driving the same, a chamber mounted above the turntable to rotate therewith and having means to contain a sheet of photographic material, means operative by said driving means for feeding the photographic material to different predetermined extents, and a mask removably mounted between said chamber and the turntable and having a passageway therethrough for the sheet.

53. In a photographic copying machine, the combination of a supporting member, laterally spaced uprights fixed thereto, having brackets toward their lower ends, a mask adapted to receive and position a sheet of photographic material and adapted to rockably rest at its lower end on said brackets whereby it may swing into and out of operative position between said uprights, and releasable means for retaining the mask in operative position.

54. In a photographic copying machine, the combination of a support, a mask mounted thereon to swing to and from operative position and adapted to hold a sheet of photographic material for exposure, a chamber to contain a supply of such photographic material and having means for directing the same to the mask, and a movable door for rendering accessible the portion of said chamber adjacent to the mask.

55. In a photographic copying machine, the combination of a mask mounted to swing to and from operative position and having a passageway therethrough for a sheet of photographic material, a chamber adapted to contain a roll of such material and having means arranged adjacent to the mask for directing the sheet thereto, and a movable door associated with said chamber for rendering accessible the sheet directing means therein, said door being engaged by a portion of the mask when the latter is in operating position to form a light-excluding joint.

56. In a photographic copying machine, means to supply a sheet of photographic material comprising devices to support a roll of such material and having an opening through which the portion of the sheet unwound from the roll passes, guides past one side of which the unwound portion of the sheet passes, and a cooperative guide operative to bend the sheet in the opposite direction from which the sheet was bent while in rolled form.

57. In a photographic copying machine, the combination of a turntable, a mask carried thereby and adapted to position a sheet of photographic material for exposure, the mask having exposure openings in its opposite sides located centrally of the axis of rotation of the turntable, and having means to engage the sheet and offset its median line with respect to said center of rotation.

58. In a photographic copying machine, the combination of a base, a turntable rotatable thereon and carrying means for holding a sheet of photographic material, feed means carried by the turntable and operative to advance the sheet, and means for driving the feed means embodying a gear on the base which surrounds the path of advance of the sheet and a cooperating gear connected to the feed means and carried by the turntable, said latter gear travelling in a path around the path of advance of the sheet.

59. In a photographic copying machine, the combination of a rotatable holder for successively positioning opposite sides of a sheet of photographic material sensitized on both sides for exposure, and feed means for advancing said sheet, said feed means being operative to grip and advance the sheet during rotation of the holder and to subsequently release the sheet and thus permit it to center itself in the holder.

60. In a photographic copying machine, the combination of a rotatable holder for positioning a sheet of photographic material for exposure, feed rolls adapted to engage and advance the sheet, and means operative to cause said rolls to grip and advance the sheet and to subsequently disengage from the sheet and thus permit it to adjust itself incident to each rotation of the holder.

61. In a photographic copying machine, the combination of a holder for positioning a sheet of photographic material for exposure, feed rolls for advancing the sheet, and means for causing the feed rolls to move relatively toward one another to engage and advance the sheet and to relatively separate to interrupt the advance of the sheet and to release the sheet and thus permit it to adjust itself.

62. In a photographic copying machine, the combination of a rotatable holder for positioning a sheet of photographic material for exposure, feed rolls carried upon and adjacent to one end of the holder to engage and advance the sheet, and light-excluding flanges on the holder extending laterally over the rollers for protecting the portion of the sheet between the feed rolls and the adjacent end of the holder from exposure by light.

63. A photographic copying machine comprising, in combination, a rotatable member for holding sheet material sensitized on both sides in position to expose one side thereof, means for rotating said member to a position to expose the opposite side of said sheet material, and mechanism effective during such rotation for feeding said sheet material.

64. A photographic copying machine comprising, in combination, means for holding a supply of sheet material sensitized on both sides, a movable member shiftable from a position for holding sheet material to expose one side thereof to another position for holding sheet material to expose the opposite side thereof, and mechanism effective during shifting of said movable member for feeding said sheet material.

65. A photographic copying machine comprising, in combination, means for holding a supply of sheet material sensitized on both sides, a movable member shiftable from a position for holding sheet material to expose one side thereof to another position for holding sheet material to expose the opposite side thereof, and mechanism operated by shifting of said movable member for feeding said sheet material.

66. A photographic copying machine comprising, in combination, means for holding a supply of sheet material sensitized on both sides, a movable member shiftable from a position for holding sheet material to expose one side thereof to another position for holding sheet material to expose the opposite side thereof, and mechanism effective during a variable part of the shifting movement of said movable member for feeding said sheet material.

67. A photographic copying machine comprising, in combination, a rotatable member for holding sheet material sensitized on both sides in position to expose one side thereof, means for rotating said member to a position to expose the opposite side of said sheet material, and mechanism effective during such rotation for severing said sheet material.

68. A photographic copying machine comprising, in combination, means for holding a supply of sheet material sensitized on both sides, a movable member shiftable from a position for holding sheet material to expose one side thereof to another position for holding sheet material to expose the opposite side thereof, and mechanism effective during shifting of said movable member for severing said sheet material.

69. A photographic copying machine comprising, in combination, means for holding a supply of sheet material sensitized on both sides, a movable member shiftable from a position for holding sheet material to expose one side thereof to another position for holding sheet material to expose the opposite side thereof, and mechanism operated by shifting of said movable member for severing said sheet material.

70. A photographic copying machine comprising, in combination, means for holding a supply of sheet material sensitized on both sides, a movable member shiftable from a position for holding sheet material to expose one side thereof to another position for holding sheet material to expose the opposite side thereof, and mechanism effective during shifting of said movable member for feeding and severing said sheet material.

71. A photographic copying machine comprising, in combination, means for holding a supply of sheet material sensitized on both sides, a movable member shiftable from a position for holding sheet material to expose one side thereof to another position for holding sheet material to expose the opposite side thereof, and mechanism operated by shifting of said movable member for feeding and severing said sheet material.

72. A photographic copying machine comprising, in combination, means for holding a supply of sheet material sensitized on both sides, a rotatable member for holding a portion of such sheet material in position to expose each side thereof successively, and means effective upon actuation to rotate said member from a position for exposing one side of said sheet material to a position for exposing the other side thereof and to feed said sheet material.

73. A photographic copying machine comprising, in combination, means for holding a supply of sheet material sensitized on both sides, a rotatable member for holding a portion of such sheet material in position to expose each side thereof successively, and means effective upon actuation to rotate said member from a position for exposing one side of said sheet material to a position for exposing the other side thereof and to sever said sheet material.

74. A photographic copying machine comprising, in combination, means for holding a supply of sheet material sensitized on both sides, a rotatable member for holding a portion of such sheet material in position to expose each side thereof succesively, and means effective upon actuation to rotate said member from a position for exposing one side of said sheet material to a position for exposing the other side thereof and to feed and sever said sheet material.

75. A photographic copying machine comprising, in combination, means for holding a supply of sheet material sensitized on both sides, a rotatable member for holding a portion of such sheet material in position to expose each side thereof successively, and power driving mechanism effective to rotate said member from a position for exposing one side of said sheet material to a position for exposing the other side thereof and to feed said sheet material.

76. A photographic copying machine comprising, in combination, means for holding a supply of sheet material sensitized on both sides, a rotatable member for holding a portion of such sheet material in position to expose each side thereof successively, and power driving mechanism effective to rotate said member from a position for exposing one side of said sheet material to a position for exposing the other side thereof and to sever said sheet material.

77. A photographic copying machine comprising, in combination, means for holding a supply of sheet material sensitized on both sides, a rotatable member for holding a portion of such sheet material in position to expose each side thereof successively, constantly operating power driving mechanism, means for operatively connecting said driving mechanism to said rotatable member to rotate the latter from a position for exposing one side of said sheet material to a position for exposing the other side thereof, and means automatically disconnecting said driving mechanism from said rotatable member when the latter reaches a predetermined position.

78. A photographic copying machine comprising, in combination, a base, a rotatable member for holding sheet material sensitized on both sides in position to expose each side thereof successively, feeding means for said sheet material, and actuating means for said feeding means, said actuating means including gear means on said base and gear means on said rotatable member cooperating with said gear means on said base during rotation of said member.

79. A photographic copying machine comprising, in combination, means for holding sensitized sheet material in position to be exposed, sheet feeding means, and control mechanism for determining the extent of feeding imparted to said sheet material by said feeding means, said control mechanism including a cam of variable length for varying said extent of feeding.

In testimony whereof, I have hereunto set my hand.

ARTHUR W. CAPS.